United States Patent
Noble et al.

(10) Patent No.: US 7,793,683 B2
(45) Date of Patent: Sep. 14, 2010

(54) ACTIVE INTAKE PRESSURE CONTROL OF DOWNHOLE PUMP ASSEMBLIES

(75) Inventors: Evan Noble, Edmonton (CA); Roland Moneta, Vermilion (CA); Lonnie Dunn, Sherwood Park (CA)

(73) Assignee: Weatherford/Lamb, Inc., Houston, TX (US)

( * ) Notice: Subject to any disclaimer, the term of this patent is extended or adjusted under 35 U.S.C. 154(b) by 865 days.

(21) Appl. No.: 11/548,615

(22) Filed: Oct. 11, 2006

(65) Prior Publication Data

US 2008/0087332 A1    Apr. 17, 2008

(51) Int. Cl.
F16K 15/14  (2006.01)
F16K 17/02  (2006.01)
F04B 49/03  (2006.01)

(52) U.S. Cl. ............... 137/512.15; 137/848; 137/853; 138/30; 417/307

(58) Field of Classification Search ............ 137/512.15, 137/512.4, 843, 844, 845, 849, 848, 853; 417/307; 138/30; 166/357, 68, 68.5, 105, 166/316, 324, 325
See application file for complete search history.

(56) References Cited

U.S. PATENT DOCUMENTS

| | | | |
|---|---|---|---|
| 3,186,644 A * | 6/1965 | Ross et al. ............ 239/533.13 |
| 3,662,955 A * | 5/1972 | Takanashi ................... 239/145 |
| 3,814,091 A * | 6/1974 | Henkin ................... 128/202.22 |
| 4,214,445 A * | 7/1980 | Winsor et al. ................. 60/486 |
| 4,505,647 A | 3/1985 | Alloca et al. | |
| 4,559,046 A * | 12/1985 | Groshong et al. ........... 604/524 |
| 5,205,834 A * | 4/1993 | Moorehead et al. ......... 604/247 |
| 5,249,598 A * | 10/1993 | Schmidt .................. 137/493.1 |
| 5,525,146 A | 6/1996 | Straub | |
| 5,628,616 A * | 5/1997 | Lee ............................ 415/58.2 |
| 5,863,186 A | 1/1999 | Green et al. | |
| 5,961,297 A | 10/1999 | Haga et al. | |
| 5,984,209 A * | 11/1999 | Weth ........................... 239/547 |
| 6,494,686 B1 | 12/2002 | Ward | |
| 6,705,402 B2 | 3/2004 | Proctor | |
| 2004/0234681 A1 | 11/2004 | Lemke et al. | |
| 2005/0169779 A1 | 8/2005 | Bratu | |

FOREIGN PATENT DOCUMENTS

CA    2364873 A1    1/2002

OTHER PUBLICATIONS

Weatherford®; Husky Energy, PC Pump with Charge Pump.
Examiner's First Report dated Jun. 25, 2009 from AU patent application 2007 21913.

* cited by examiner

*Primary Examiner*—John Rivell
*Assistant Examiner*—Atif H Chaudry
(74) *Attorney, Agent, or Firm*—Wong, Cabello, Lutsch, Rutherford, & Brucculeri, L.L.P.

(57) ABSTRACT

Progressive cavity pump assemblies including one or more mechanisms adapted to regulate intake pressure of the main pump between a minimum intake pressure and a maximum intake pressure. In one embodiment, the mechanism is a sealing member configured to open at a threshold pressure to discharge wellbore fluid and close after falling below the threshold pressure. In an alternative embodiment, the mechanism may be a regulator assembly that adjusts the volume of output from the charge pump to the interconnect according to the pressure in the interconnect.

6 Claims, 19 Drawing Sheets

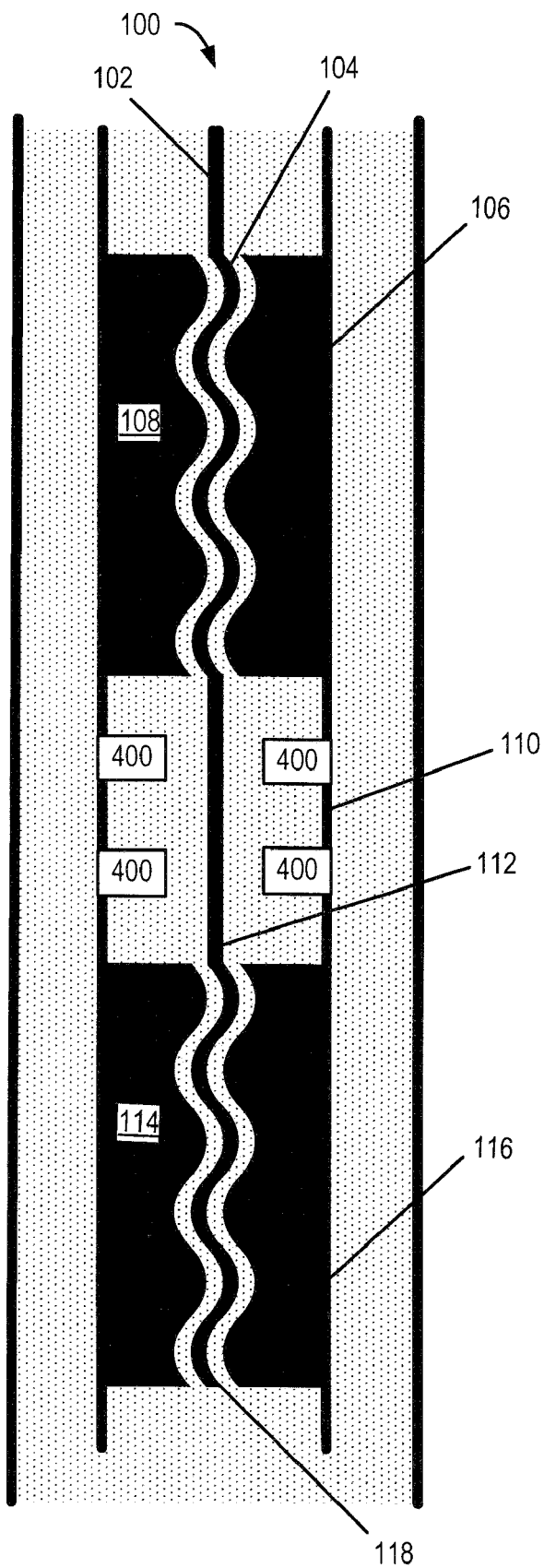
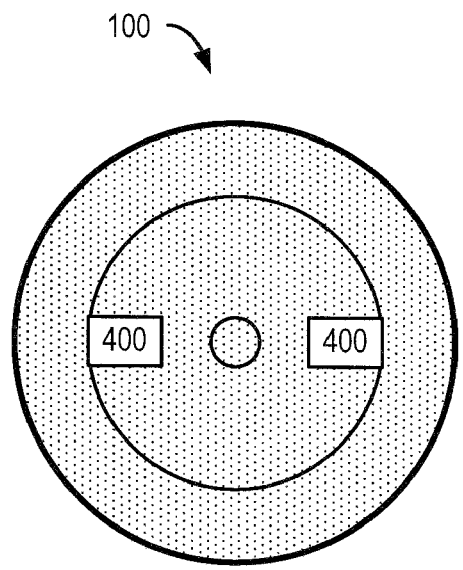
Fig. 4B
Fig. 4A

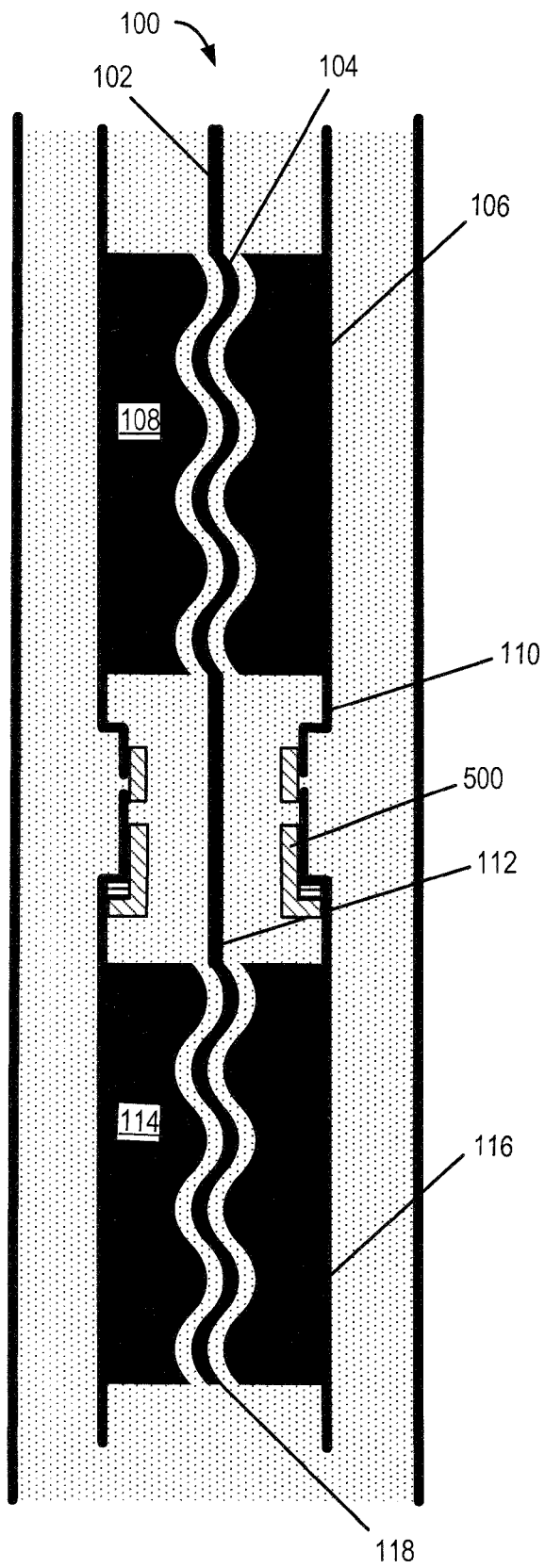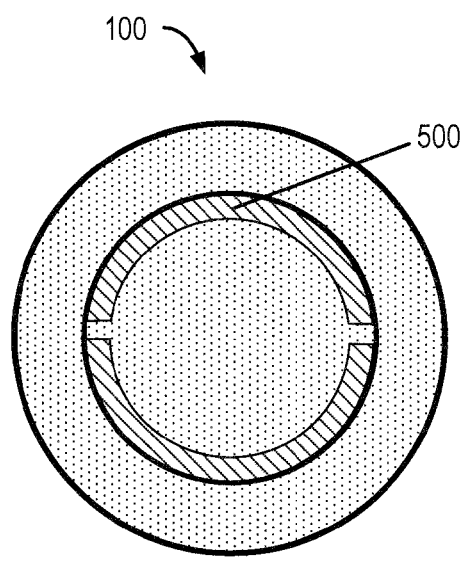
Fig. 5B
Fig. 5A

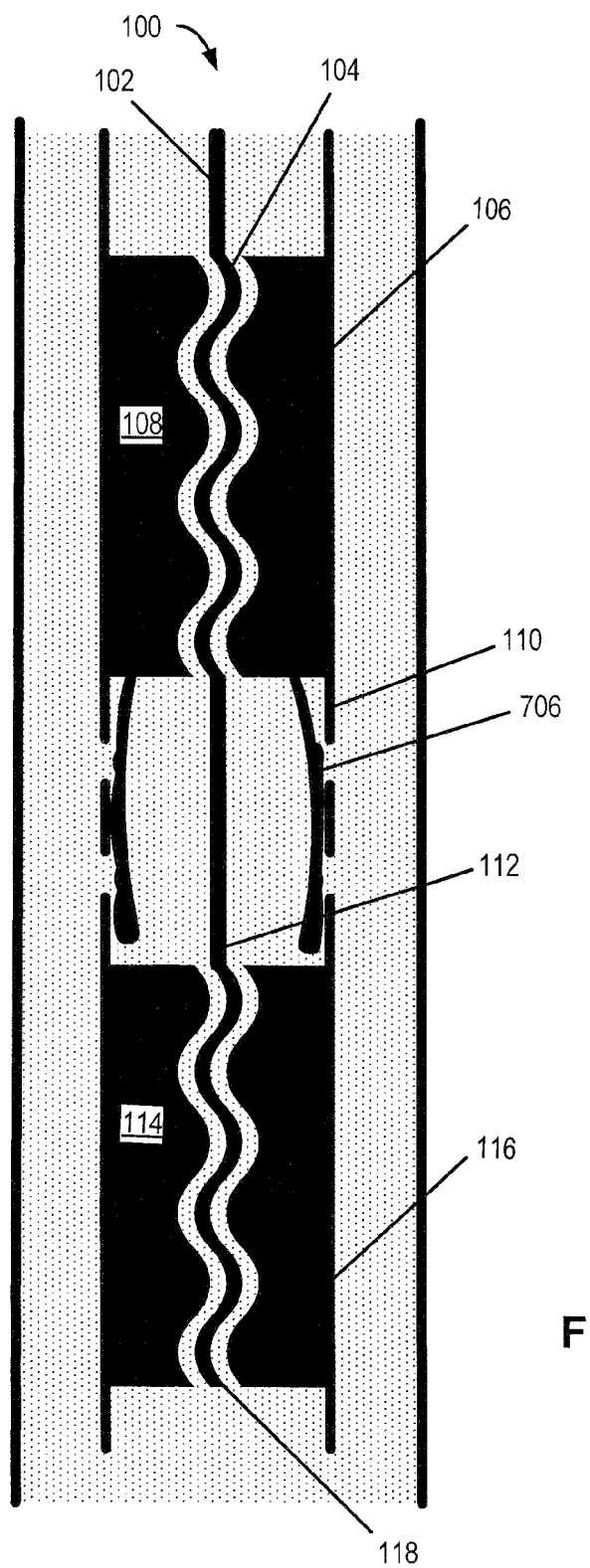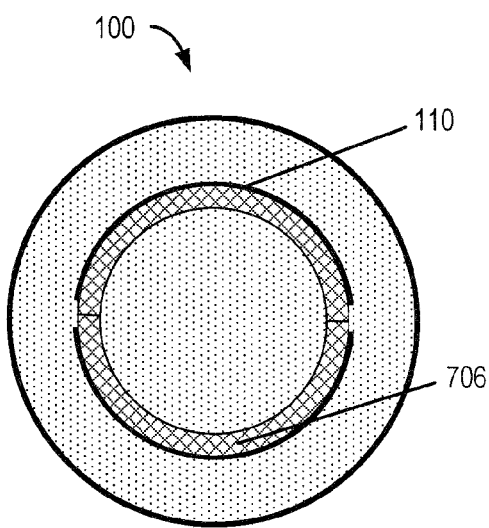
Fig. 7B
Fig. 7A

ACTIVE INTAKE PRESSURE CONTROL OF DOWNHOLE PUMP ASSEMBLIES

CROSS-REFERENCE TO RELATED APPLICATIONS

This application is filed concurrently with U.S. patent application Ser. No. 11/548,591 entitled "Active Intake Pressure Control of Downhole Pump Assemblies," which is hereby incorporated herein by reference in its entirety.

TECHNICAL FIELD

Disclosed herein are progressive cavity pump systems, including various pressure control mechanisms.

BACKGROUND

Progressive cavity pumps have long been used downhole for pumping wellbore fluids. When a lone progressive cavity pump is operated in a well where free gas or foamy oil is present, the pump does not operate as efficiently and its run life decreases. To solve this problem, a pump assembly is used having a charge pump in addition to the main production pump. Referring to FIGS. 1A and 1B, the main pump 106, located at the top of the pump assembly 100, is a high pressure/low volume pump capable of pushing the wellbore fluid the full length of the wellbore. The main (progressive cavity) pump 106 includes a rotor 104, driven by a rotating shaft 102, that turns inside a stator 108 at a fixed rate. The shaft 102 is typically driven by an electric motor (not shown). The charge pump 116, being a low pressure/high volume pump, is located below the main pump 106 and feeds it with wellbore fluid through an interconnect 110, such as a pup joint. The charge pump of FIGS. 1A and 1B is also a progressive cavity pump with a rotor 118 and stator 114, but some pump assemblies may instead use an auger for the charge pump. The effect of adding the charge pump 116 is that, due to the higher pressure in the interconnect 110, the gas is compressed to occupy less volume and may be forced into solution thereby increasing the liquid efficiency of the main pump.

The ratio of the displacements of the pumps in the pump assembly is typically designed according to the gas content of the wellbore fluid, with the charge pump having a higher displacement. When the wellbore fluid has a free gas rate of under 25 percent, a ratio of displacements of approximately 2:1 is commonly employed. With a free gas rate of 25 to 50 percent, the ratio may be approximately 4:1. For example, with free gas in the well at 15 percent, the pump assembly may use a pump with a 100-barrels-per-day displacement as the main pump and a pump with a 200-barrels-per-day displacement as the charge pump.

Problematically, the free gas rate of the wellbore fluid is often non-uniform. When the gas content of the wellbore fluid falls below the range for that the system was designed, the pressure increases dramatically, damaging the charge pump. When the gas content of the wellbore fluid exceeds the anticipated range, the pressure decreases, the effect of the charge pump on the pump assembly is nullified, and the pump assembly becomes inefficient. Non-uniform inflow of water or high viscosity liquids can have the same effect.

A current solution to high-pressure events is to create pressure relief ports 120 in the interconnect 110 in various sizes and configurations. While simple ports can discharge pressure from the interconnect 110, they are inflexible in response to pressure increases in that the amount of fluid and gas discharged from a set number and configuration of ports is proportional to the pressure in the interconnect. These ports 120 also exacerbate the problem of pressure decreases.

FIG. 2A is a graph showing the pressure in the interconnect of the main pump 202 in comparison with the fluid viscosity 216 of the liquid being pumped. Curves representing the pressure in the interconnect 202 for each fluid viscosity 216 are shown for an interconnect alternately having zero (204), two (206), four (208), eight (210), and sixteen (212) ports. As is apparent from FIG. 2A, the greater the number of ports, the more slowly the interconnect pressure 202 increases in comparison to the fluid viscosity 216. In the current ported interconnect method, therefore, using a larger number of ports to avoid a pressure increase detrimental to the charge pump results in a less than optimal range of fluid viscosities that produce an interconnect pressure 202 greater than the minimum of the efficient range 214, and vice versa.

FIG. 2B is a graph showing the pressure in the interconnect of the main pump 234 in comparison with the free gas rate 236 of the liquid being pumped. Curves representing the pressure in the interconnect 234 for each free gas rate 236 are shown for an interconnect alternately having zero (224), two (226), and four (228) ports. As is apparent from FIG. 2B, the greater the number of ports, the more slowly the interconnect pressure 202 increases as the free gas rate 236 decreases. Again, using a larger number of ports to avoid a detrimental pressure increase results in a less than optimal range of free gas rates that produce an interconnect pressure 234 greater than the minimum of the efficient range 214.

The pressure curves of FIGS. 2A and 2B are for example only, as the curves associated with a specific implementation of pump assembly (with varying main and charge pump displacements, sizes of interconnect, sizes and numbers of ports, etc.) will vary.

Changing the port configuration or the displacement from the charge pump when the pressure is approaching the upper or lower limit of the efficient range reduces non-uniformity in interconnect pressure. An ideal design, therefore, would include a mechanism for changing the port configuration or the configuration of the charge pump in response to the pressure at the inlet port of the main pump. Disclosed herein are pump assemblies that include these pressure control mechanisms.

SUMMARY

Disclosed herein are progressive cavity pump assemblies including one or more mechanisms adapted to regulate intake pressure of the main pump between a minimum intake pressure and a maximum intake pressure. In one embodiment, the mechanism is a sealing member configured to open at a threshold pressure to discharge wellbore fluid and close after falling below the threshold pressure. In an alternative embodiment, the mechanism may be a regulator assembly that adjusts the volume of output from the charge pump to the interconnect according to the pressure in the interconnect.

BRIEF DESCRIPTION OF THE DRAWINGS

FIGS. 4A-D illustrate an exemplary valve for discharging wellbore fluid according to the present disclosure.

FIGS. 7A-D illustrate an exemplary bladder assembly for discharging wellbore fluid according to the present disclosure.

DETAILED DESCRIPTION

Disclosed herein are pump assemblies including one or more mechanisms adapted to regulate intake pressure of the main pump in the efficient range between a minimum intake pressure and a maximum intake pressure. In one embodiment, pressure is decreased by discharging wellbore fluid from the pump assembly. In an alternative embodiment, the mechanism may be a regulator assembly that adjusts the volume of output from the charge pump to the interconnect according to the pressure in the interconnect. Specific design details have been provided for illustration but should not be considered limiting. Readers of skill in the art will recognize that many variations of pump assemblies may be implemented consistent with the scope of the invention as described by the appended claims.

I. Dishcharging Mechanisms

The pressure control mechanism may be a sealing member configured to open at a threshold pressure to discharge wellbore fluid. Typically, these sealing members discharge pressure from pressure relief ports in the interconnect, but pressure may be discharged from elsewhere in the pump assembly. In various embodiments, the sealing members may be implemented as valves, stoppers, flaps, and so on.

Figure 3A:
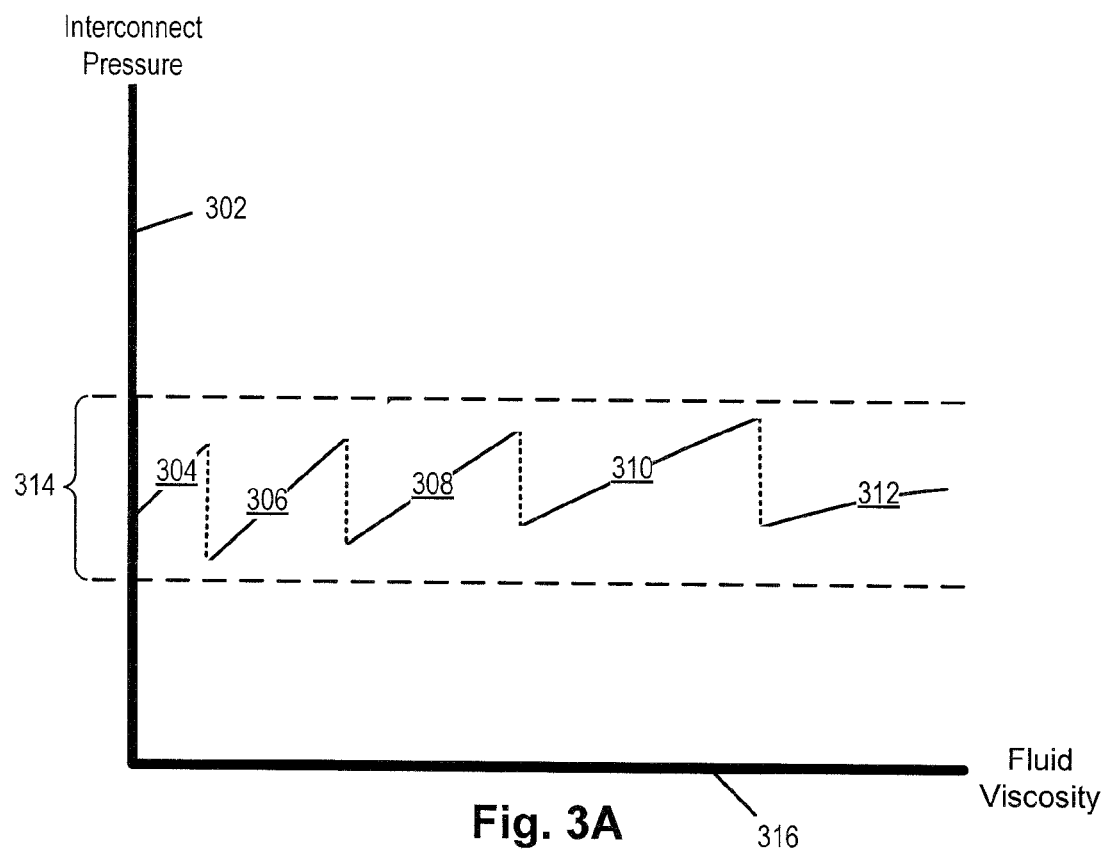
FIGS. 3A and 3B are graphs showing pressure in a progressive cavity pump assembly according to the present disclosure.
Figure 3B:
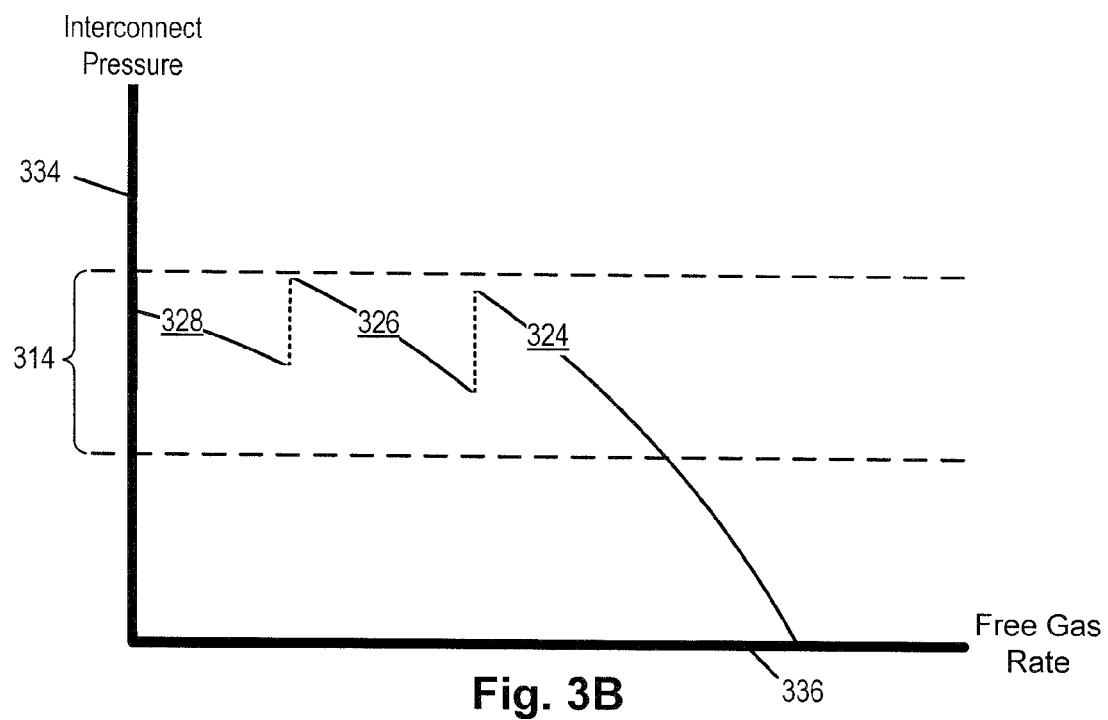

FIGS. 3A and 3B are graphs showing the interconnect pressure 302 in comparison with, alternately, the well fluid viscosity 316 (FIG. 3A) and the free gas rate 336 (FIG. 3B). In FIG. 3A, a curve representing the interconnect pressure 302 for each fluid viscosity 316 is shown for an interconnect that opens two sealing member at 120 psi, two sealing members at 140 psi, a set of four sealing members at 160 psi, and a set of eight sealing members at 180 psi. The efficient range 314 is shown with a minimum pressure of 100 psi and a maximum pressure of 300 psi.

Figure 1A:
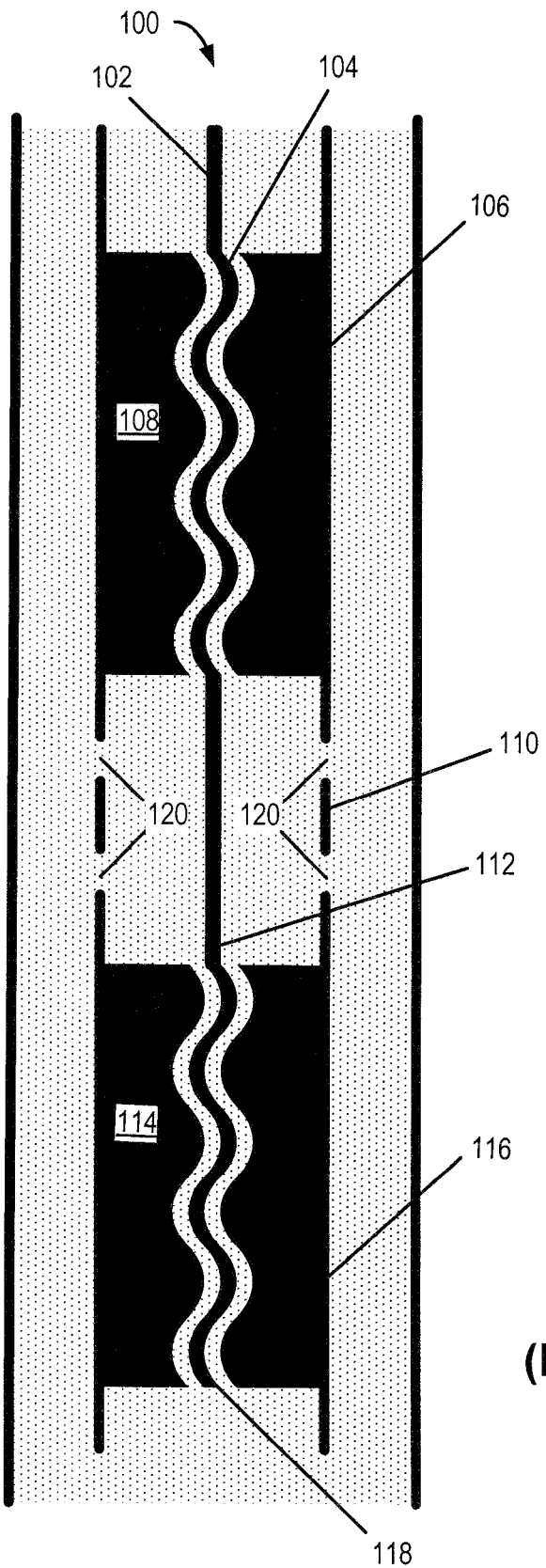
FIGS. 1A and 1B illustrate a prior art progressive cavity pump assembly.
Figure 1B:
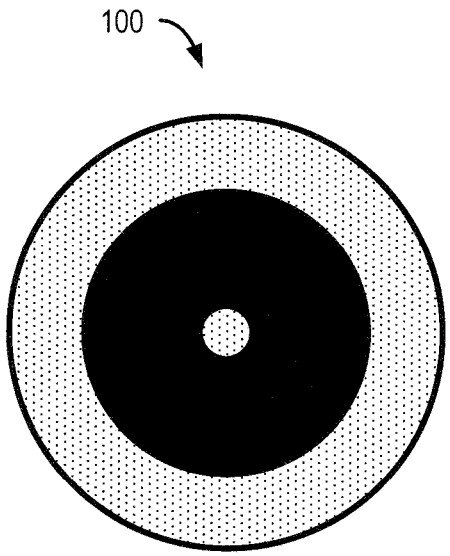
Figure 2A:
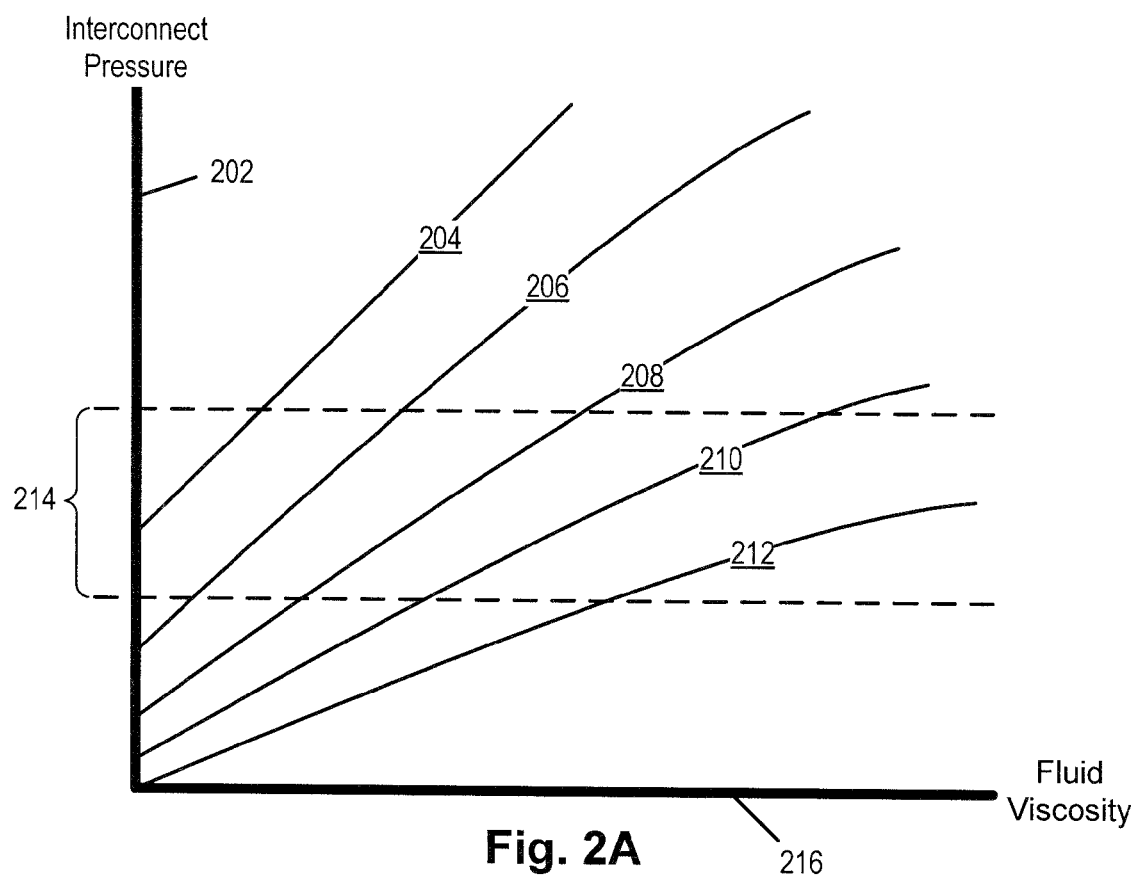
FIGS. 2A and 2B are graphs showing pressure in a prior art progressive cavity pump assembly.

In an initial configuration, shown by curve segment 304, the curve exhibits behavior identical to the previously discussed zero-port interconnect of FIG. 2A. This behavior optimizes the range of fluid viscosities that produce an interconnect pressure 302 greater than the range minimum. The initial configuration 304 ends at a critical pressure, where the first set of sealing members opens.

In the second configuration, the pressure at the inlet port of the main pump 302 builds similarly to the two-port interconnect, as shown by curve segment 306. This behavior optimizes the range of fluid viscosities that produce an interconnect pressure 302 lower than the maximum. If fluid viscosity 316 increases sufficiently, the interconnect pressure 302 will continue to increase despite the open ports until the second, third, and fourth sets of sealing members open. Curve segments 308, 310, and 312 represent subsequent configurations with four, eight, and sixteen open ports, respectively. The behavior of each configuration is similar to that of the interconnect of FIG. 2A with a corresponding number of ports. Each configuration ends at a critical pressure, where the subsequent set of sealing members opens. The number of open ports is increased in each configuration in order to optimize the range of fluid viscosities that produce an interconnect pressure lower than the maximum. Thus, by letting pressure build up before releasing it by opening a sealing member to discharge it, the inlet pressure is kept within the efficient range over a larger range of fluid viscosities.

Figure 2B:
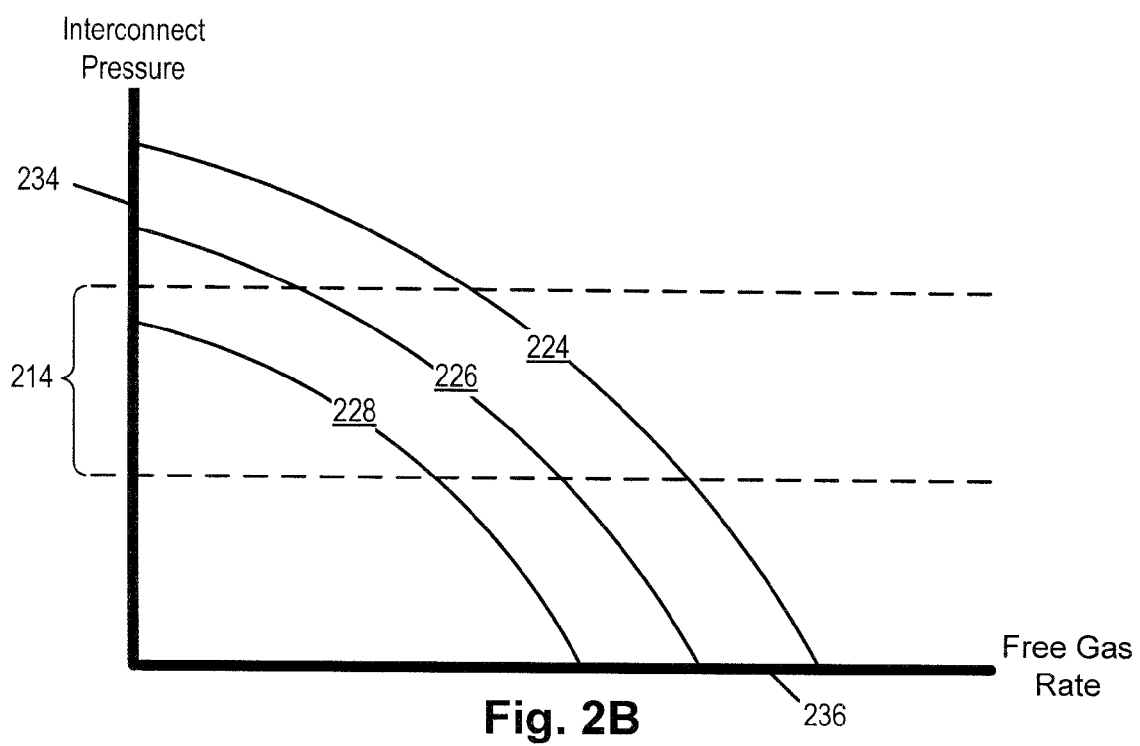

FIG. 3B shows the effect of changing free gas rates on interconnect pressure in an interconnect that opens two sealing members at 120 psi and two more sealing members at 140 psi. Thus, the interconnect represented by FIG. 3B has a zero-port configuration, a two-port configuration, and a four-port configuration represented by curve segments 324, 326, and 328, respectively. Each configuration ends at a critical pressure, where the subsequent set of sealing members opens. The behavior of each configuration is similar to that of the interconnect of FIG. 2B with a corresponding number of ports. In FIG. 3B, interconnect pressure 334 increases as free gas rates 336 decline. The efficient range 314 is shown with a minimum pressure of 100 psi and a maximum pressure of 300 psi. Thus, the number of open ports is increased in each configuration in order to optimize the range of free gas rates that produce an interconnect pressure within the efficient range.

Figure 4C:
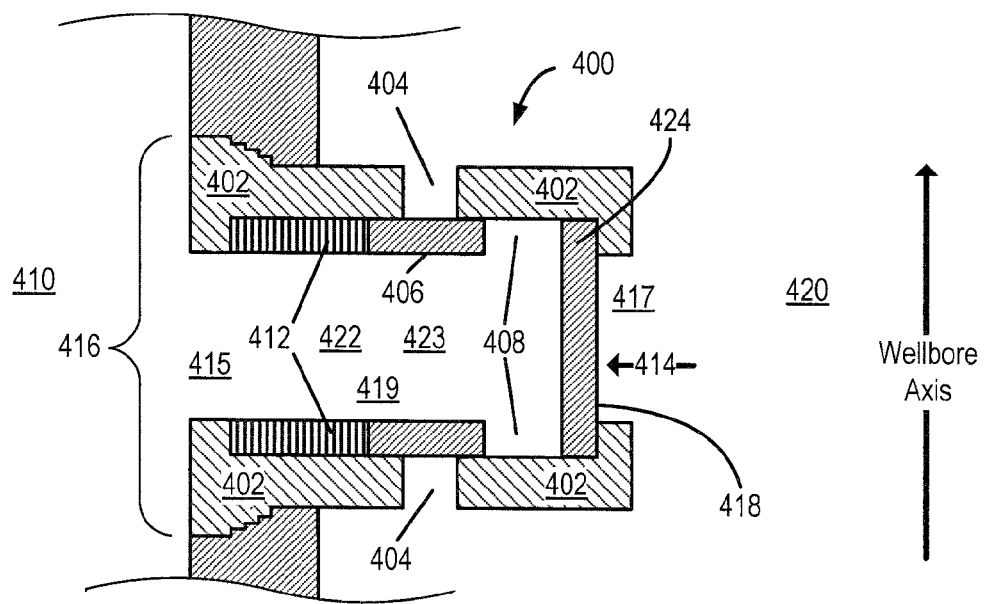
Figure 4D:
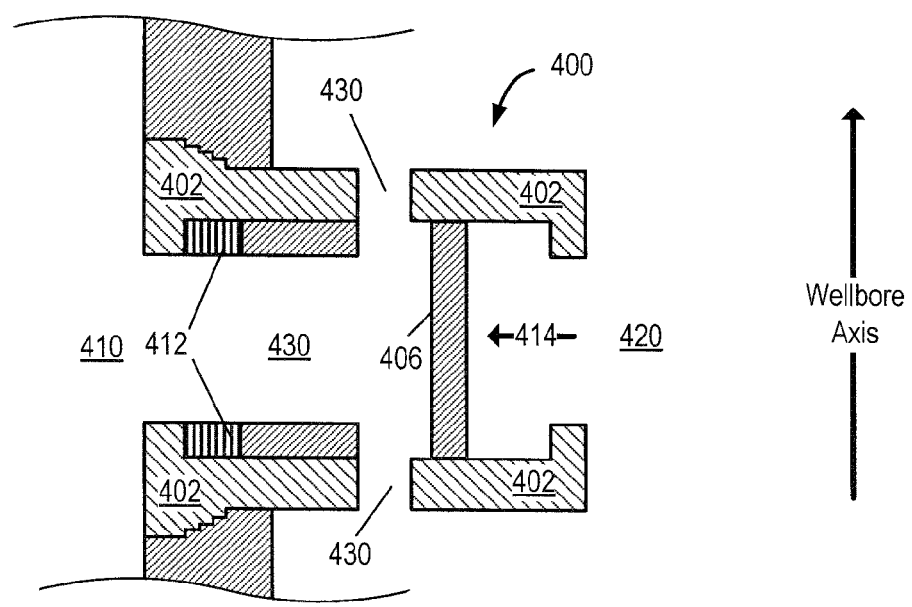

Exemplary sealing mechanisms adapted to regulate intake pressure of the main pump will now be described. FIGS. 4A-D illustrate an exemplary valve for discharging wellbore fluid. FIGS. 4A and 4B show the valves 400 in the interconnect 110 of the pump assembly 100. FIG. 4C shows the valve 400 before a threshold pressure is exceeded. FIG. 4D shows the valve 400 after a threshold pressure is exceeded. The valve 400 includes a substantially cylindrical first housing member 402 having a passage 422 running through its longitudinal axis. The first housing member 402 is welded in the pressure relief port 416 so as to seal the annulus between the first housing member 402 and the pressure relief port 416. The axial passage 422 is in fluid communication with the exterior 410 of the interconnect at one end ("the exterior end 415") and the interior 420 of the interconnect at the other end ("the interior end" 417). The first housing member 402 has two first housing ports 404 in the curved side of the first housing member 402 that also connects the passage 422 and the interior 420 of the interconnect.

A substantially cylindrical second housing member 406 is slideably mounted inside the first housing member 402 on a pressure bearing (not shown). The pressure bearing seals the annulus between the first housing member 402 and the second housing member 406. The second housing member 406 has an axial passage 423 running partly therethrough, the passage 423 closed at one end by a portion 424 of the second housing assembly transverse to the passage and open at the other end. The open end 419 of the second housing member is in fluid communication with the exterior end 415 of the first passage 422. The closed end 418 of the second housing member 406 is oriented towards the interior end 417 of the first housing member's passage. The second housing member 406 is urged towards the interior end 417 of this passage by a biasing member 412, so that the transverse portion 424 is located between the first housing port 404 and the interior end 417 of the first passage 422. The transverse portion 422 of the second housing member 406 separates the interior 417 and exterior 415 ends of the first passage 422. The second housing member 406 has a second housing port 408 in its curved side in fluid communication with the second passage 423. The second housing port 408 is located inside the first passage 422 closer to the interior end 417 than the first housing port 404, but farther away than the transverse portion 424.

A biasing member 412 is mounted between the second housing member 406 and a seat in the first housing member 402. The biasing member 412 urges the first and second housing ports to the configuration shown in FIG. 4C. The biasing member 412 may be, for example, a spring or an elastomer (e.g., rubber) disc.

In the closed configuration, as shown in FIG. 4C, the two housing ports 404, 406 are not aligned, and the exterior 410 of the interconnect is sealed from the interior 420. Pressure 414 from the interior 420 of the interconnect acting on the end of the second housing member 406 pushes the second housing member 406 against the biasing member 412, which resists the force. The second housing member 406 may slide down the first housing member's passage toward the open configuration, without reaching the open configuration.

When the pressure 414 from the interior 420 of the interconnect exceeds the valve's threshold pressure, the second housing member 406 slides into the open configuration, as shown in FIG. 4D, where the first and second housing ports (404, 408) align, creating a passage 430 from the interior 420 to the exterior 410 of the interconnect, through which wellbore fluid flows, thereby decreasing the pressure 414 in the interior 420 of the interconnect. The threshold pressure is selected to optimize the range of charge pump discharge pressures that produce a main pump inlet pressure greater than the efficient range minimum and less than the maximum, as described above with reference to FIGS. 3A and 3B. After the pressure 414 has dropped below the predetermined threshold pressure, the force against the closed end 418 of the second housing member 406 is insufficient to compensate for the biasing member 412, and the biasing member 412 closes the valve.

More than one pressure relief valve may be provided in the interconnect. In the case of multiple valves, discharging may be staggered for various pressure thresholds. In such an implementation, the valves may be configured to open at different threshold pressures, so that more fluid is discharged as the intake pressure of the main pump exceeds each different threshold pressure.

For example, an interconnect may have three valves with threshold pressures of 100 200, and 300 [Evan: please provide actual numbers] pounds per square inch (psi) respectively. Thus, upon reaching a pressure of 100 psi (assumed here to be a marginally high pressure), only the first valve is open, to marginally counteract the increase in pressure. Upon reaching a detrimentally high pressure of 300 psi, all three valves are open for maximum pressure release. The specific break pressures provided above are for example only. Many configurations of pumping assembly are possible, with each configuration having its own design parameters.

Figure 5C:
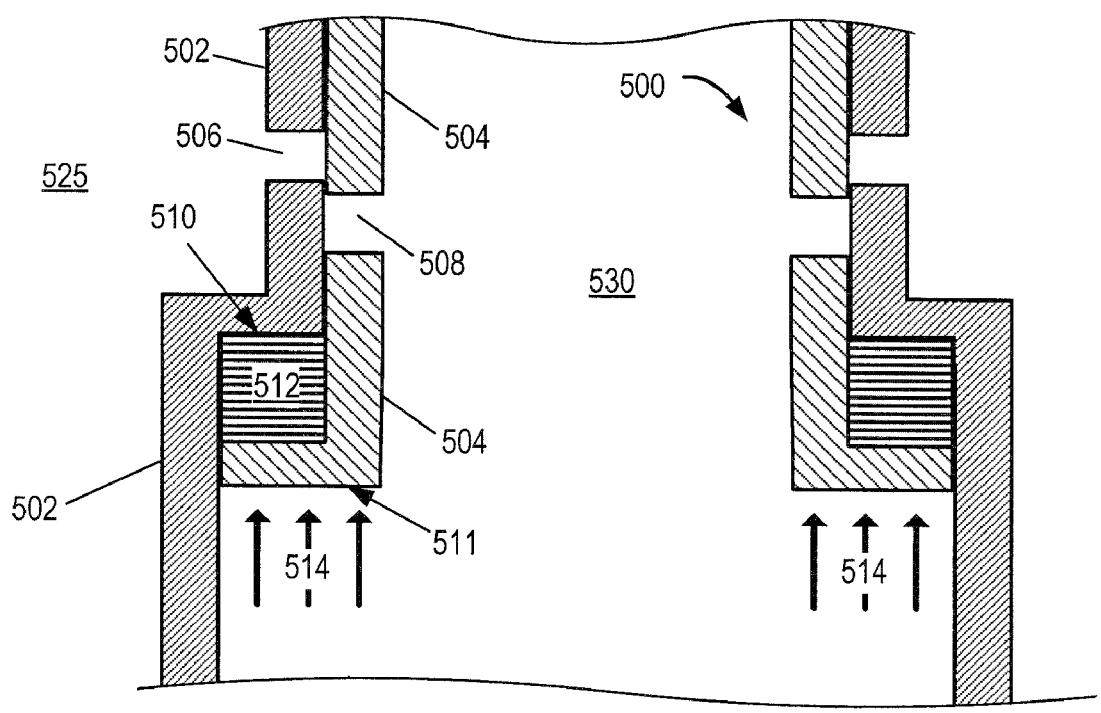
FIGS. 5A-H illustrate exemplary stoppers for discharging wellbore fluid according to the present disclosure.
Figure 5D:
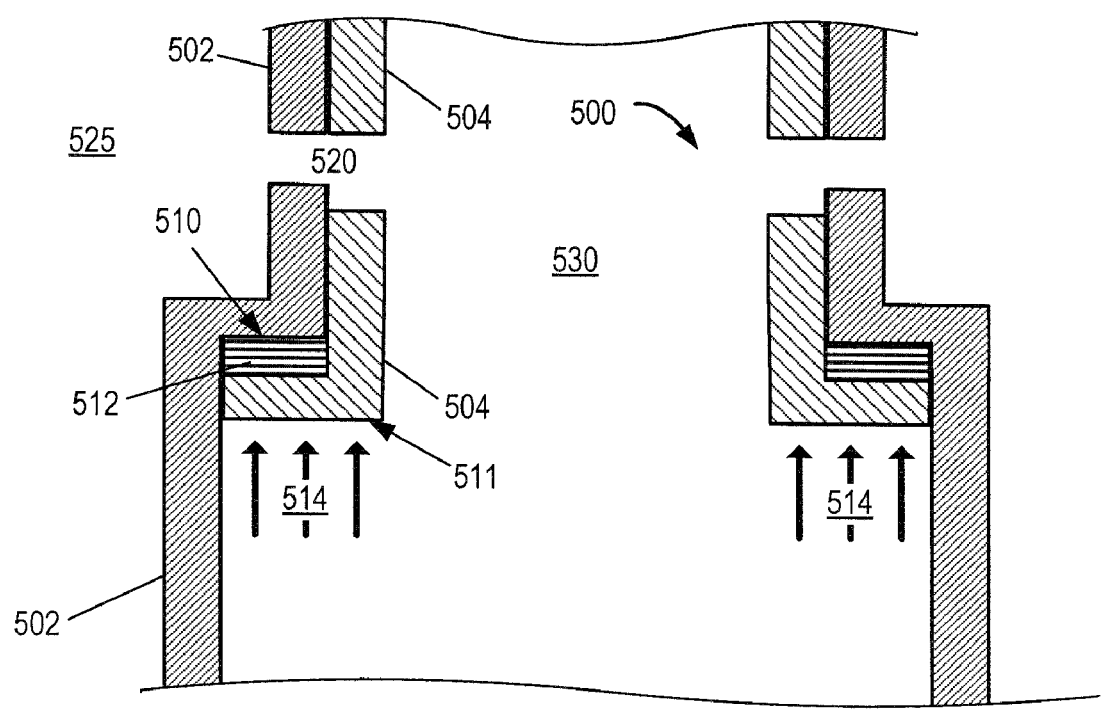

FIGS. 5A-D illustrate an exemplary stopper 500 for discharging wellbore fluid. FIGS. 5A and 5B show the stopper 500 in the interconnect 110 of the pump assembly 100. FIG. 5C shows the stopper 500 before a threshold pressure is exceeded. FIG. 5D shows the stopper 500 after a threshold pressure is exceeded. The stopper 500 includes a substantially cylindrical manifold 504 coaxially mounted in the interconnect 502 and moveable along the longitudinal axis of the interconnect 502. The manifold has stopper ports 508 corresponding to pressure relief ports 506. A surface 511 may be attached to the manifold 504. The surface 511 is preferentially perpendicular to the manifold, but may be otherwise oriented. The interconnect 502 also includes a surface 510 substantially perpendicular to its main axis. Biasing member 512 sits between the perpendicular surfaces 510 and 511 and urges the manifold 504 towards the closed configuration.

In the closed configuration, as shown in FIG. 5C, the stopper ports 508 and pressure relief ports 506 are not aligned, and the exterior 525 of the interconnect is sealed from the interior 530. Pressure 514 from the interior 530 of the interconnect, acting on surface 511, pushes the stopper 500 against the biasing member 512, which resists the force. As the pressure 514 from the interior 530 of the interconnect increases, the stopper 500 may slide axially in the interconnect 502 toward the open configuration, but does not reach the open configuration until after the pressure has reached the threshold pressure.

When the pressure 514 in the interior 530 of the interconnect exceeds the stopper's threshold pressure, the pressure 514 exerted on surface 511 slides the stopper 500 into the open configuration, as shown in FIG. 5D, where the stopper ports 508 and pressure relief ports 506 align, creating a passage 520 from the interior 530 to exterior 525 of the interconnect 502, through which wellbore fluid flows, relieving pressure. After the pressure 514 has dropped below the threshold, the force against the perpendicular surface 511 of the stopper 500 is insufficient to compensate for the biasing member 512, and the biasing member 512 urges the stopper 500 closed. The threshold pressure is selected to optimize the range of discharge pressures from the charge pump which result in a main pump inlet pressure in the efficient range.

Figure 5E:
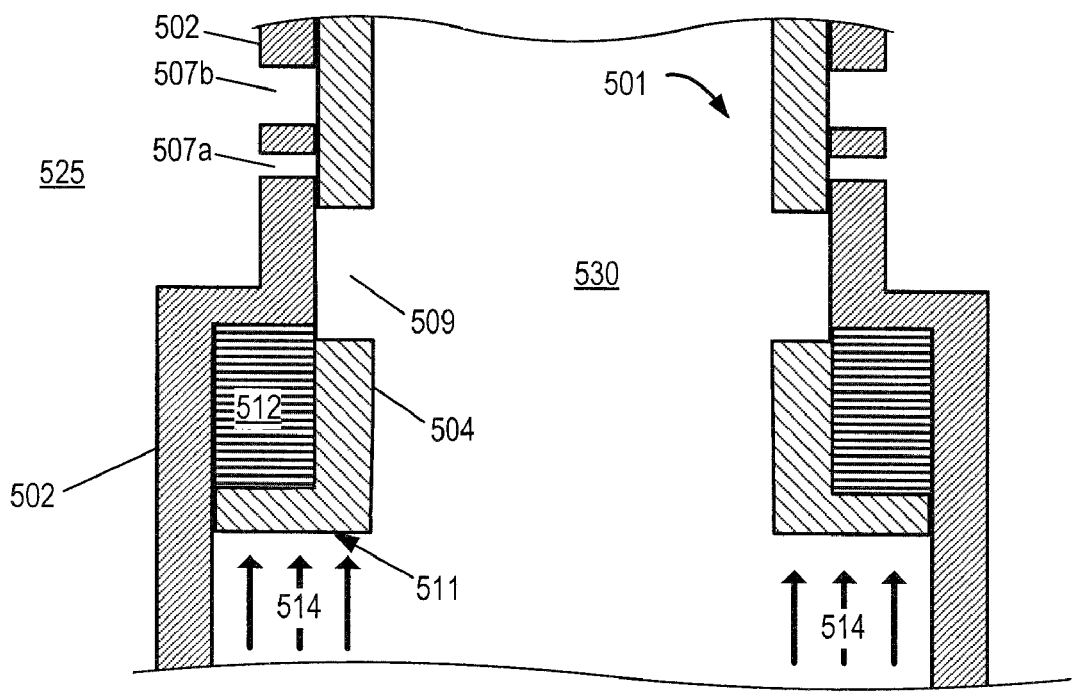
Figure 5F:
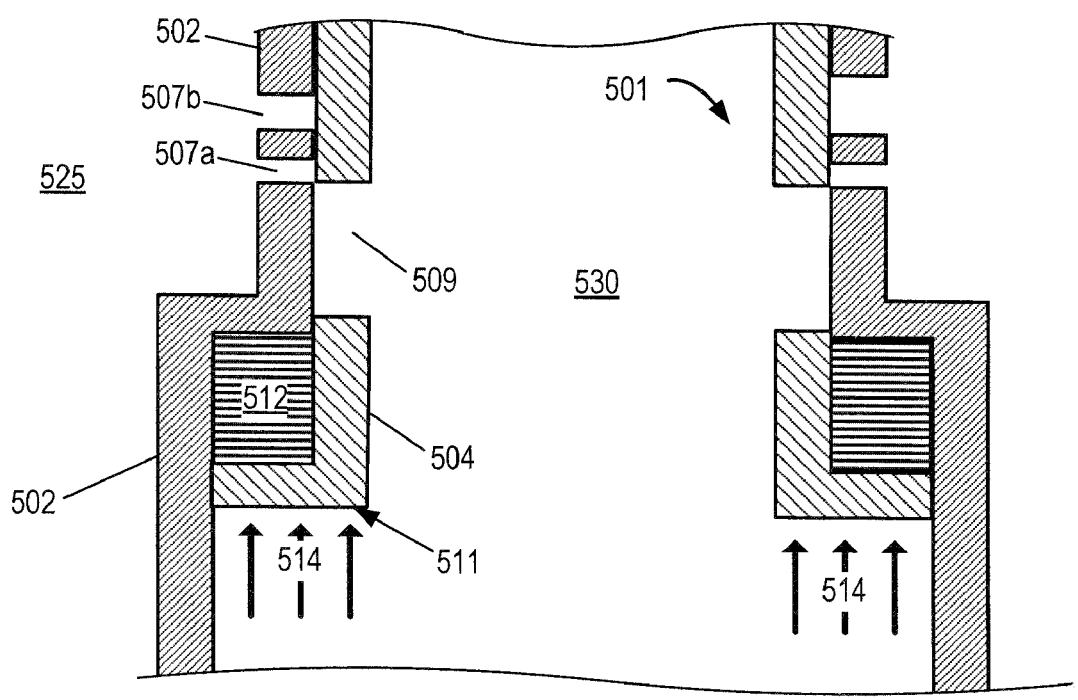
Figure 5G:
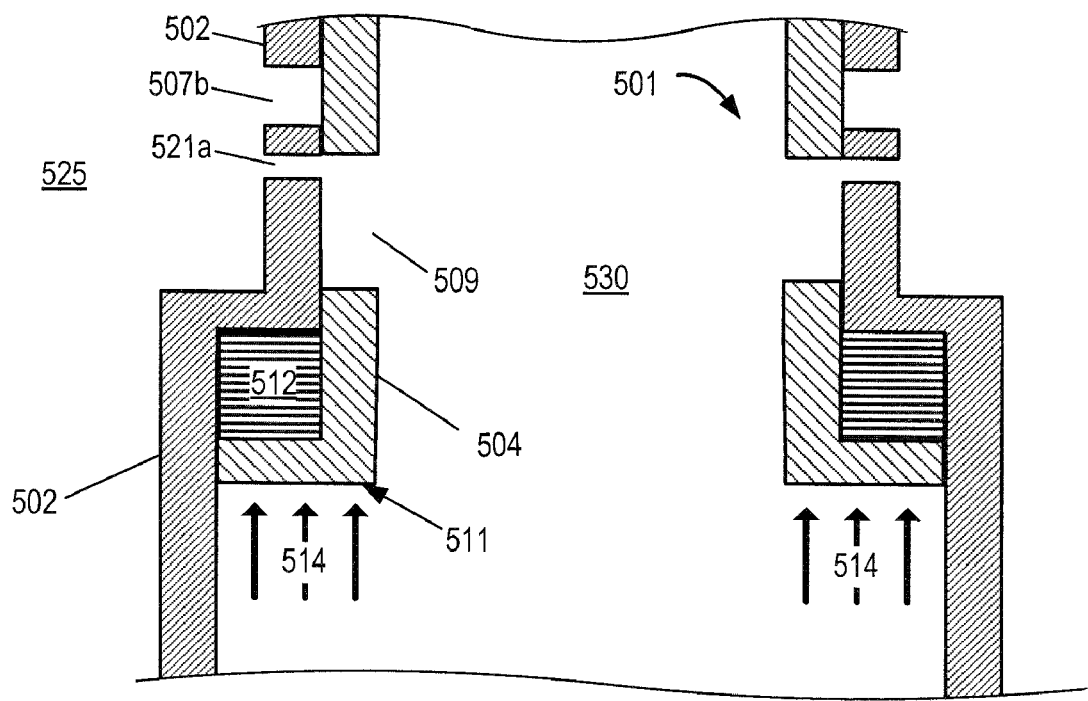
Figure 5H:
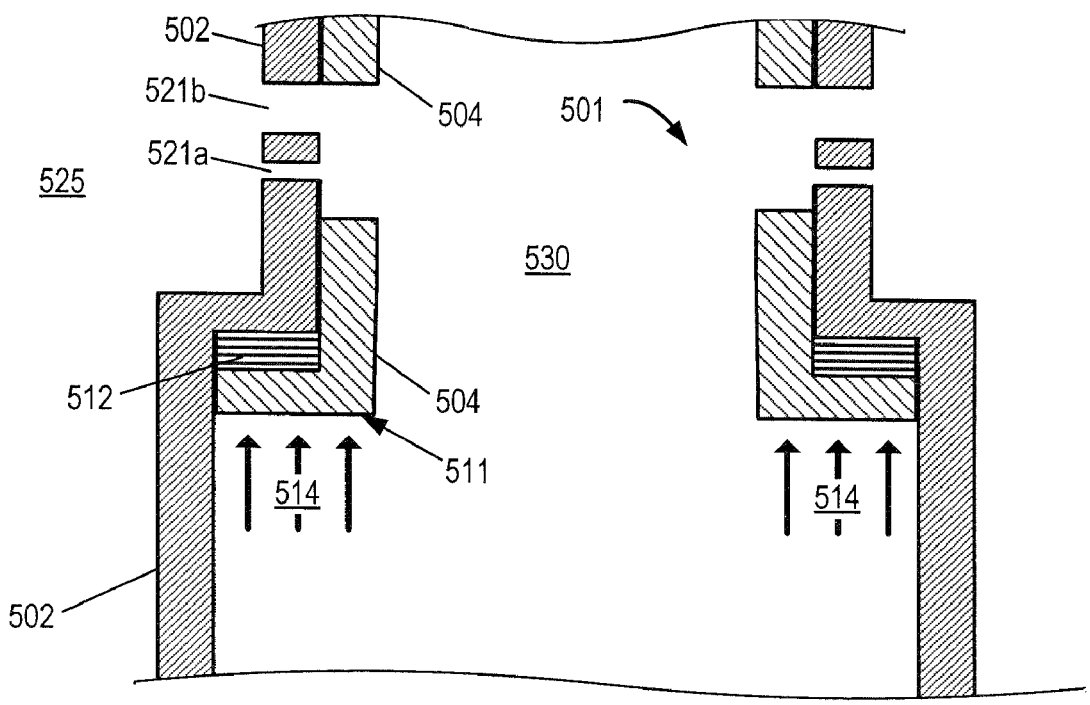

The interconnect may have multiple pressure relief ports and/or the stopper may have multiple stopper ports. In the case of multiple ports, discharging may be staggered for various pressure thresholds. FIGS. 5E-H illustrate a stopper 501 with stopper ports 505 that align with multiple pressure relief ports 507a and 507b. FIG. 5E shows the stopper 501 at a nominal pressure in closed configuration. FIG. 5F shows the stopper 501 before a threshold pressure is exceeded. FIG. 5G shows the stopper 501 after a first threshold pressure is exceeded. FIG. 5H shows the stopper 501 after a second threshold pressure is exceeded. The manifold has stopper ports 509 corresponding to pressure relief ports 507a and 507b. Other than the ports, stopper 501 operates similarly to stopper 500. In the closed configuration, as shown in FIGS. 5E and 5F, the stopper ports 509 and pressure relief ports 507a and 507b are not aligned, and the exterior 525 of the interconnect is sealed from the interior 530. As the pressure 514 from the interior 530 of the interconnect increases, shown in FIG. 5F, the stopper 501 slides axially in the interconnect 502 toward the open configuration, but does not reach the open configuration.

When the pressure 514 in the interior 530 of the interconnect exceeds the stopper's first threshold pressure, the pressure 514 exerted on surface 511 slides the stopper 501 into the half open configuration, as shown in FIG. 5G, where the stopper ports 509 and pressure relief ports 507a align, creating a passage 521a from the interior 530 to the exterior 525 of the interconnect 502, through which wellbore fluid flows, relieving pressure. After the pressure 514 has dropped below the first threshold, the biasing member 512 closes the stopper 501.

If pressure 514 continues to increase despite the release of fluid through passage 520a, the pressure 514 exerted on surface 511 slides the stopper 501 into the full open configuration, as shown in FIG. 5H, where the stopper port 509 and pressure relief port 507b align in addition to the stopper ports 509 and pressure relief ports 507a, creating a passage 521b from the interior 530 to exterior 525 of the interconnect 502, through which wellbore fluid flows, relieving more pressure than passage 521a alone. After the pressure 514 has dropped below the second threshold, the biasing member 512 returns the stopper to the half open configuration above.

Figure 5J:
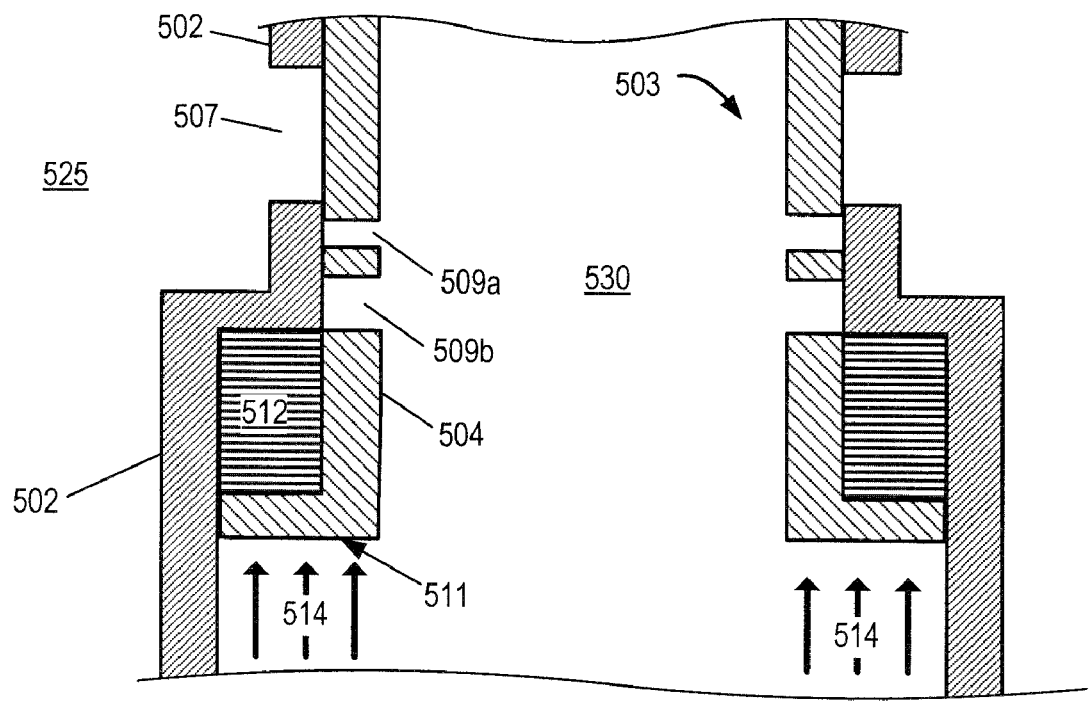
Figure 5K:
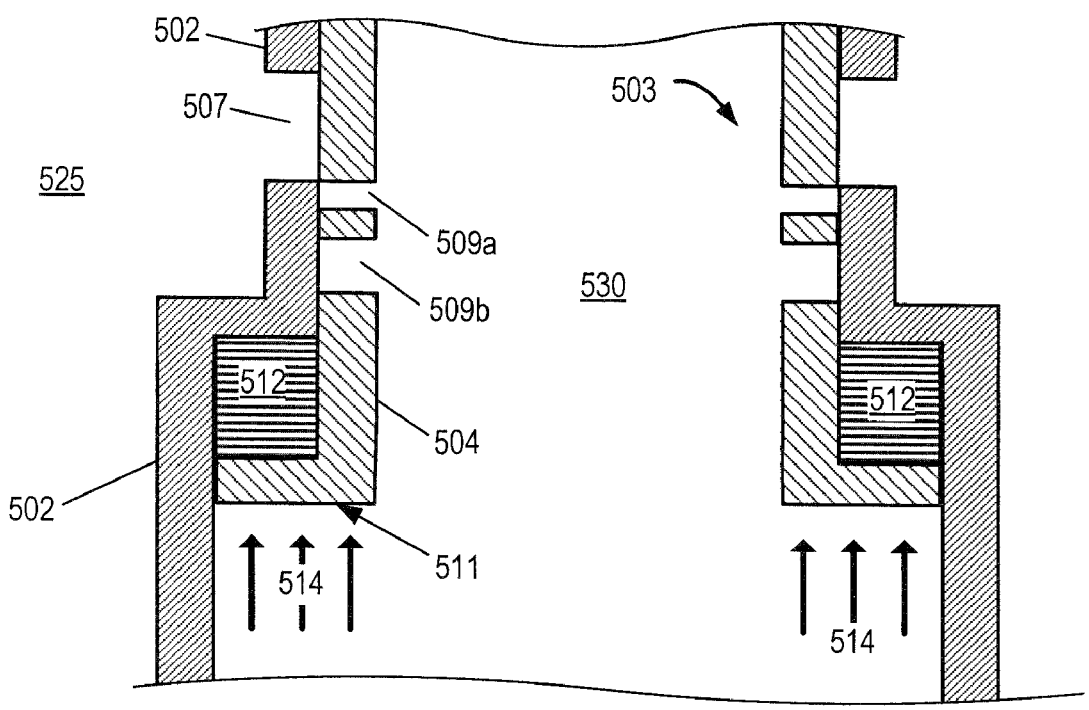
Figure 5L:
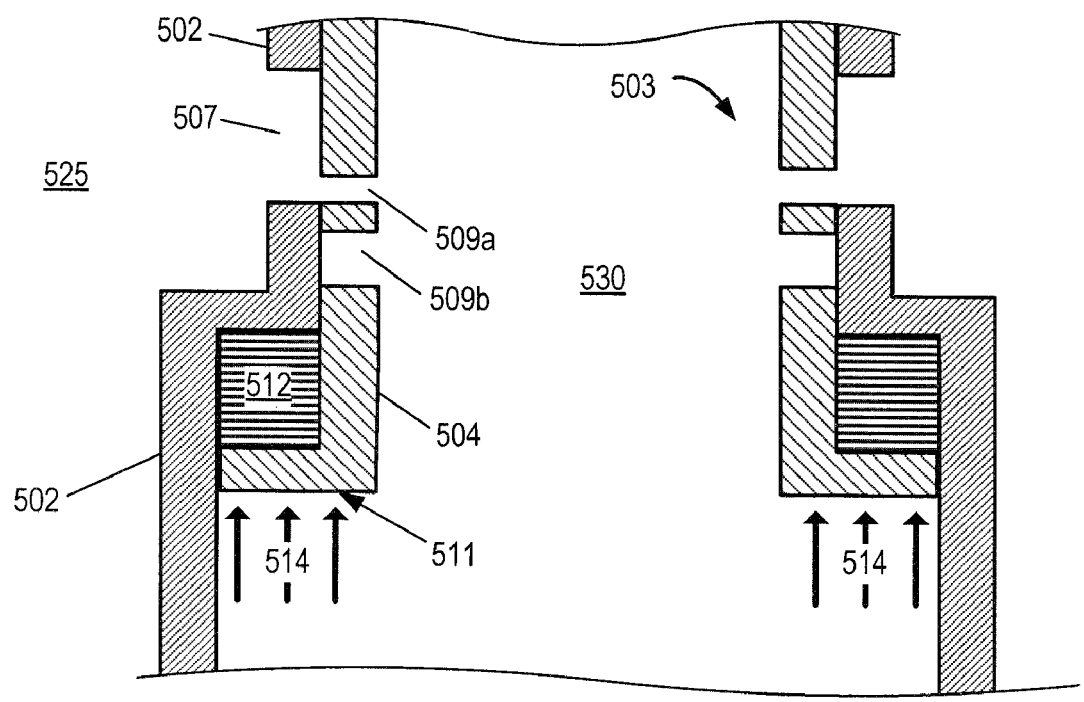
Figure 5M:
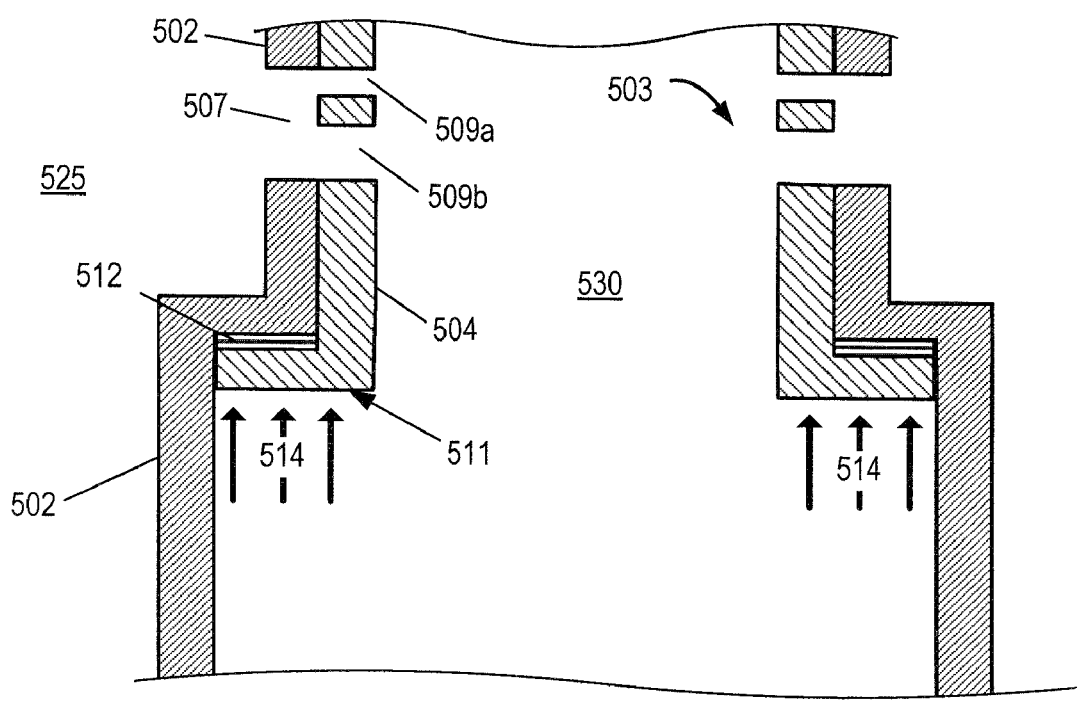

FIGS. 5J-M illustrate a stopper 503 with multiple stopper ports 509a and 509b that align (in turn) with a pressure relief ports 507. FIG. 5J shows the stopper 503 at a nominal pressure in closed configuration. FIG. 5K shows the stopper 503 before a threshold pressure is exceeded. FIG. 5L shows the stopper 503 after a first threshold pressure is exceeded. FIG. 5M shows the stopper 503 after a second threshold pressure is exceeded. The manifold has stopper ports 509a and 509b corresponding to pressure relief ports 507. Other than the ports, stopper 503 operates similarly to stopper 500. In the closed configuration, as shown in FIGS. 5J and 5K, the stopper ports 509a and 509b and pressure relief port 507 are not aligned, and the exterior 525 of the interconnect is sealed from the interior 530. As the pressure 514 from the interior 530 of the interconnect increases, shown in FIG. 5F, the stopper 503 slides axially in the interconnect 502 toward the open configuration, but does not reach the open configuration.

When the pressure 514 in the interior 530 of the interconnect exceeds the stopper's first threshold pressure, the pressure 514 exerted on surface 511 slides the stopper 501 into the half open configuration, as shown in FIG. 5L, where stopper ports 509a and pressure relief ports 507 align, creating a passage 523a from the interior 530 to exterior 525 of the interconnect 502, through which wellbore fluid flows, relieving pressure. After the pressure 514 has dropped below the first threshold, the biasing member 512 closes the stopper 503.

If pressure 514 continues to increase despite the release of fluid through passage 523a, the pressure 514 exerted on surface 511 slides the stopper 503 into the full open configuration, as shown in FIG. 5M, where the stopper ports 509b and pressure relief ports 507 align in addition to the stopper ports 509a and pressure relief ports 507, creating a passage 523b from the interior 530 to exterior 525 of the interconnect 502, through which wellbore fluid flows, relieving more pressure than passage 523a alone. After the pressure 514 has dropped below the second threshold, the biasing member 512 returns the stopper to the half open configuration above.

In other configurations, at a particular threshold pressure, multiple pressure relief ports may be aligned with multiple stopper ports. Thus, in each of the implementations above, more wellbore fluid is discharged as the intake pressure of the main pump exceeds each different threshold pressure.

Figure 6A:
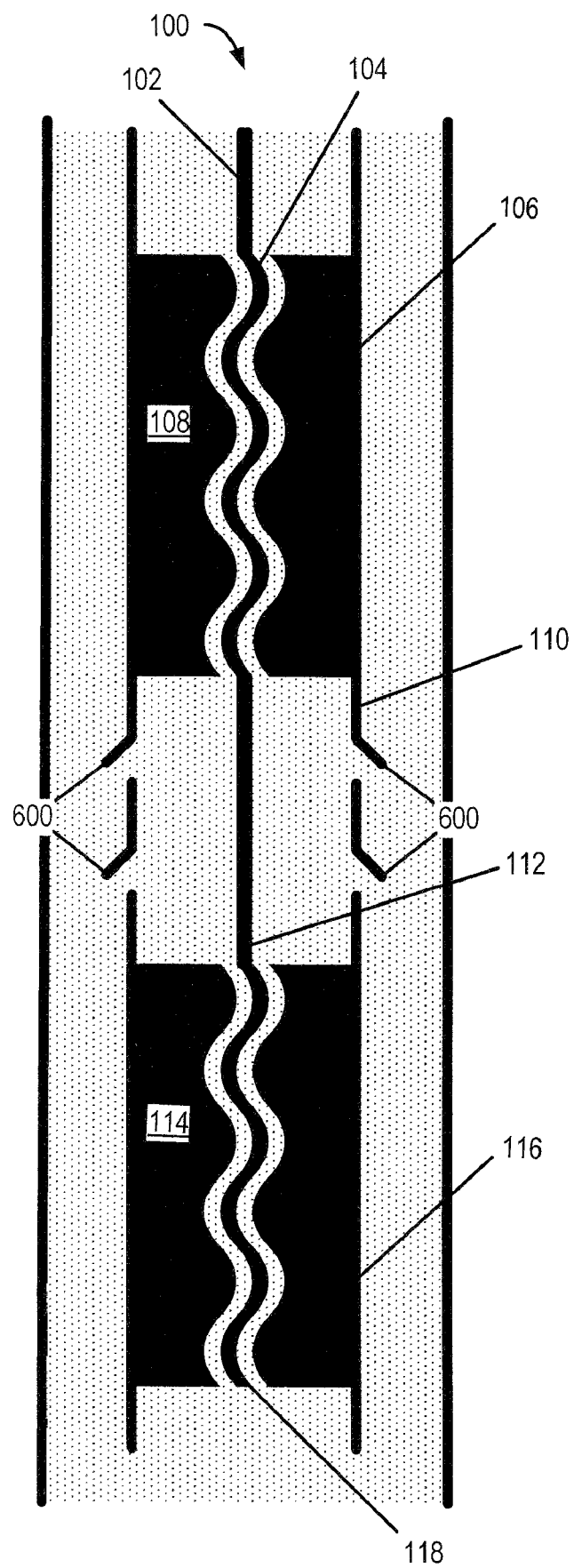
FIGS. 6A-C illustrate an exemplary external flap assembly for discharging wellbore fluid according to the present disclosure.
Figure 6B:
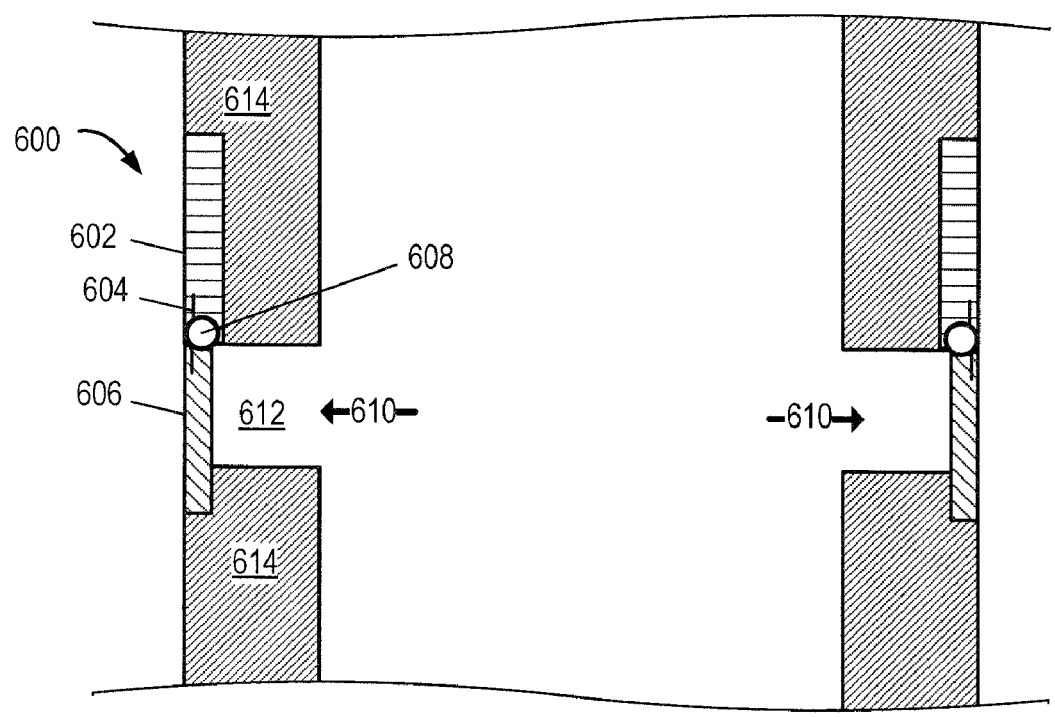
Figure 6C:
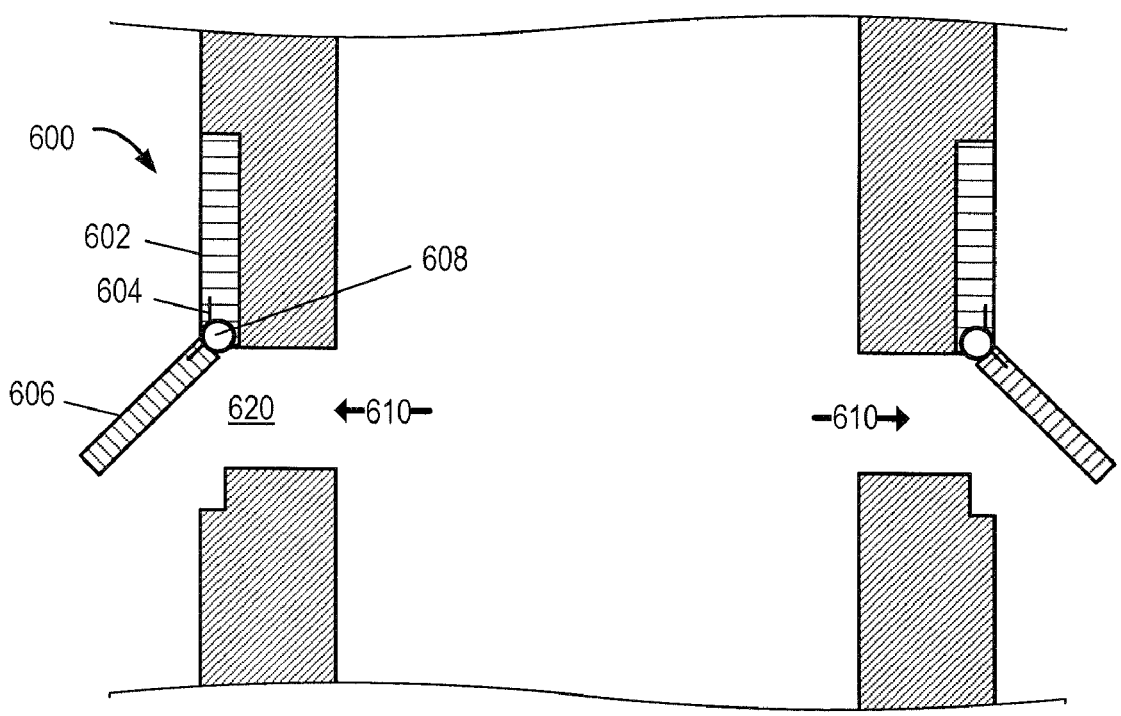

FIGS. 6A-C illustrate an exemplary external flap assembly 600 for discharging wellbore fluid. FIG. 6A shows the external flap assembly 600 in the interconnect 110 of the pump assembly 100. FIG. 6B shows the flap assembly 600 before a threshold pressure is exceeded. FIG. 6C shows the flap assembly 600 after a threshold pressure is exceeded. The flap assembly 600 includes a base 602 attached to the exterior of the interconnect 614, for example, by welding, and a flap 606 for blocking the pressure relief port 612 movably attached to the base 602 by an attachment member 608 such as a hinge, tether, membrane, etc. The flap assembly 600 also includes a biasing member 604 (e.g., a spring) that biases the flap 606 against the exterior of the interconnect 614 to block the pressure relief port.

When the pressure 610 in the interior of the interconnect reaches a threshold pressure, the pressure pushes against the resistance of the biasing member 604 to rotate the flap 606 away from the pressure relief port 612 providing a path 620 for wellbore fluid to discharge from the interconnect, as shown in FIG. 6C. Similarly to the other sealing members discussed above, the threshold pressure is selected to keep the main pump inlet pressure in the efficient range, and the selection may be influenced by hysteresis effects.

Figure 7C:
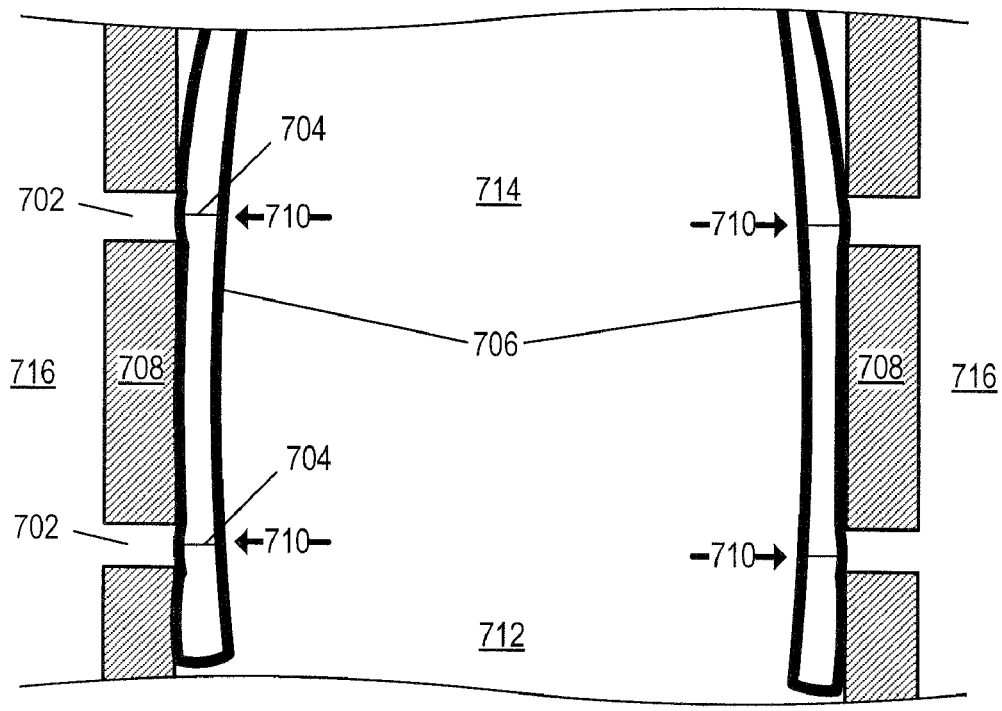
Figure 7D:
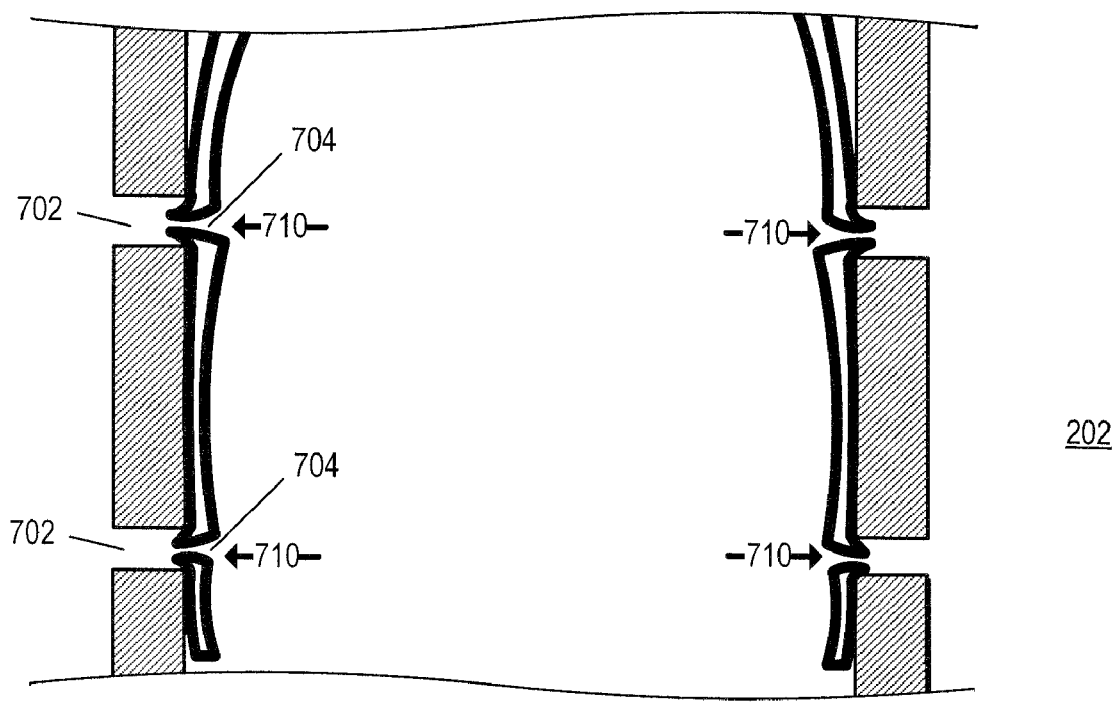

FIGS. 7A-D illustrate an exemplary bladder assembly 700 for discharging wellbore fluid. FIGS. 7A and 7B show the exemplary bladder assembly 700 in the interconnect 110 of the pump assembly 100. FIG. 7C shows the bladder assembly 700 before a threshold pressure is exceeded. FIG. 7D shows the bladder assembly 700 after a threshold pressure is exceeded. The bladder assembly 700 includes a pliable bladder 706 inside the interconnect 708 with a first opening 710 at a first end in fluid communication with the charge pump outlet port and a second opening at a second end (not shown) in fluid communication with the main pump intake port (not shown). The bladder 706 is preferably made of an elastomeric material, such as rubber, and includes slits 704 aligned with the pressure relief ports 702.

As shown in FIG. 7C, as long as the pressure 710 inside the interconnect 708 is below the threshold pressure, the slits 702 remain closed, and the exterior 716 of the interconnect is sealed from the interior 714. When the pressure 710 in the interior 714 of the interconnect 708 exceeds the slits' threshold pressure, the pressure 710 forces the slit 702 open, as shown in FIG. 7D, allowing wellbore fluid to escape. After the pressure 710 has dropped below the threshold, the slits 702 close. Hysteresis effects may result in a lag between the pressure dropping below the threshold and the slits closing. The threshold pressure may be selected to account for these hysteresis effects.

The opening characteristics for the slits may be varied to provide a staggered pressure relief as discussed above. These opening characteristics include threshold pressure, deformability, size of the opening at a pressure, or recovery time once pressure has subsided. The bladder assembly may include more than one bladder. Some of these multiple bladders may be made of less flexible materials, made thicker, or be stretched less to increase threshold pressure and decrease the size of the slit upon deformation from pressure. The opposite effect may be achieved by the opposite action. Threshold pressure of a slit may also be decreased by increasing the size of the closed slit.

II. Charge Pump Output Control

Other methods besides discharging wellbore fluid are used to regulate intake pressure of the main pump. For example, intake pressure in the main pump may also be controlled by a regulator assembly that adjusts the pressure capability of the charge pump according to the pressure in the interconnect.

Figure 8A:
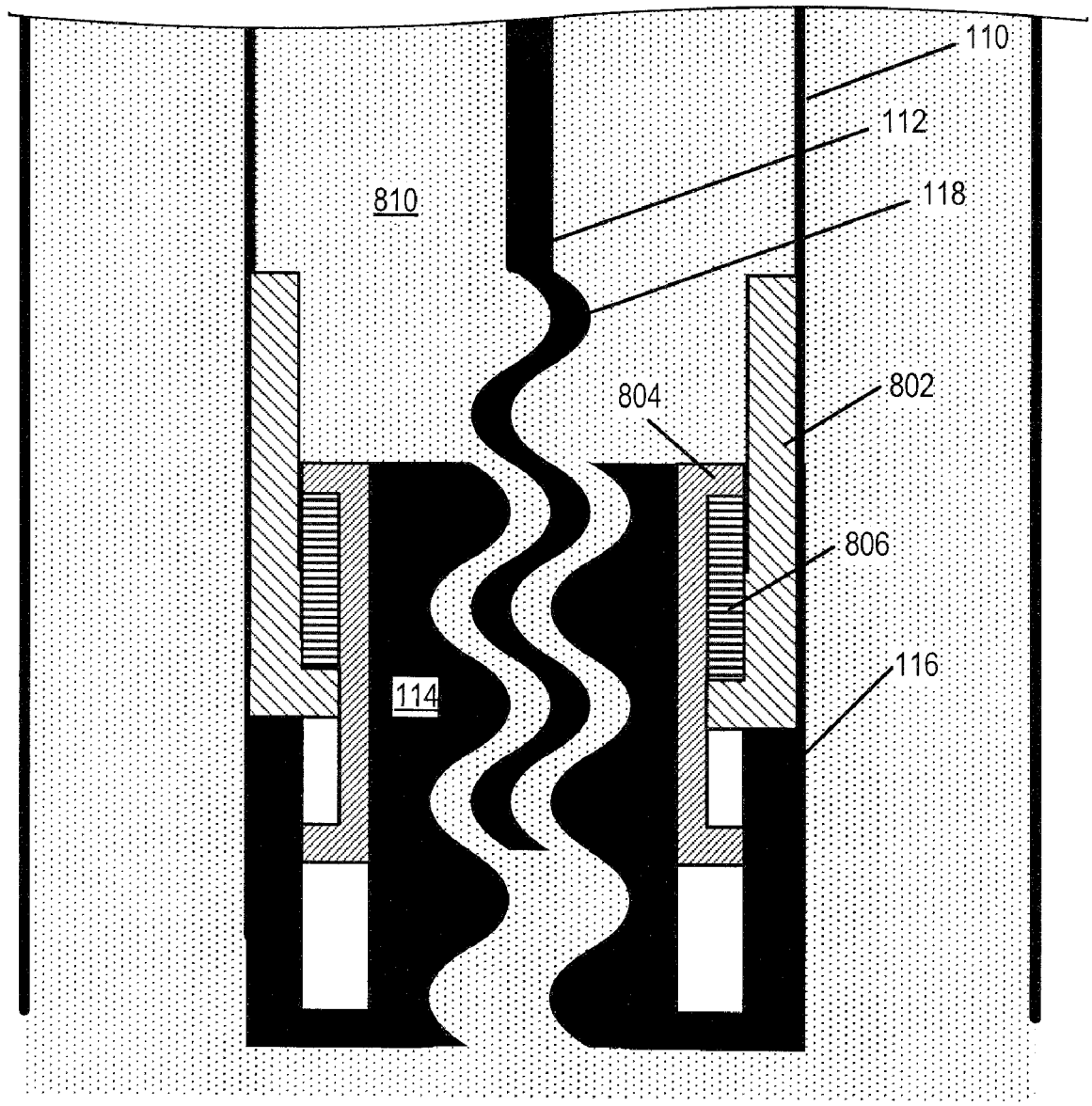
FIGS. 8A-8C illustrate a progressive cavity pump assembly having an exemplary regulator assembly according to the present disclosure.
Figure 8B:
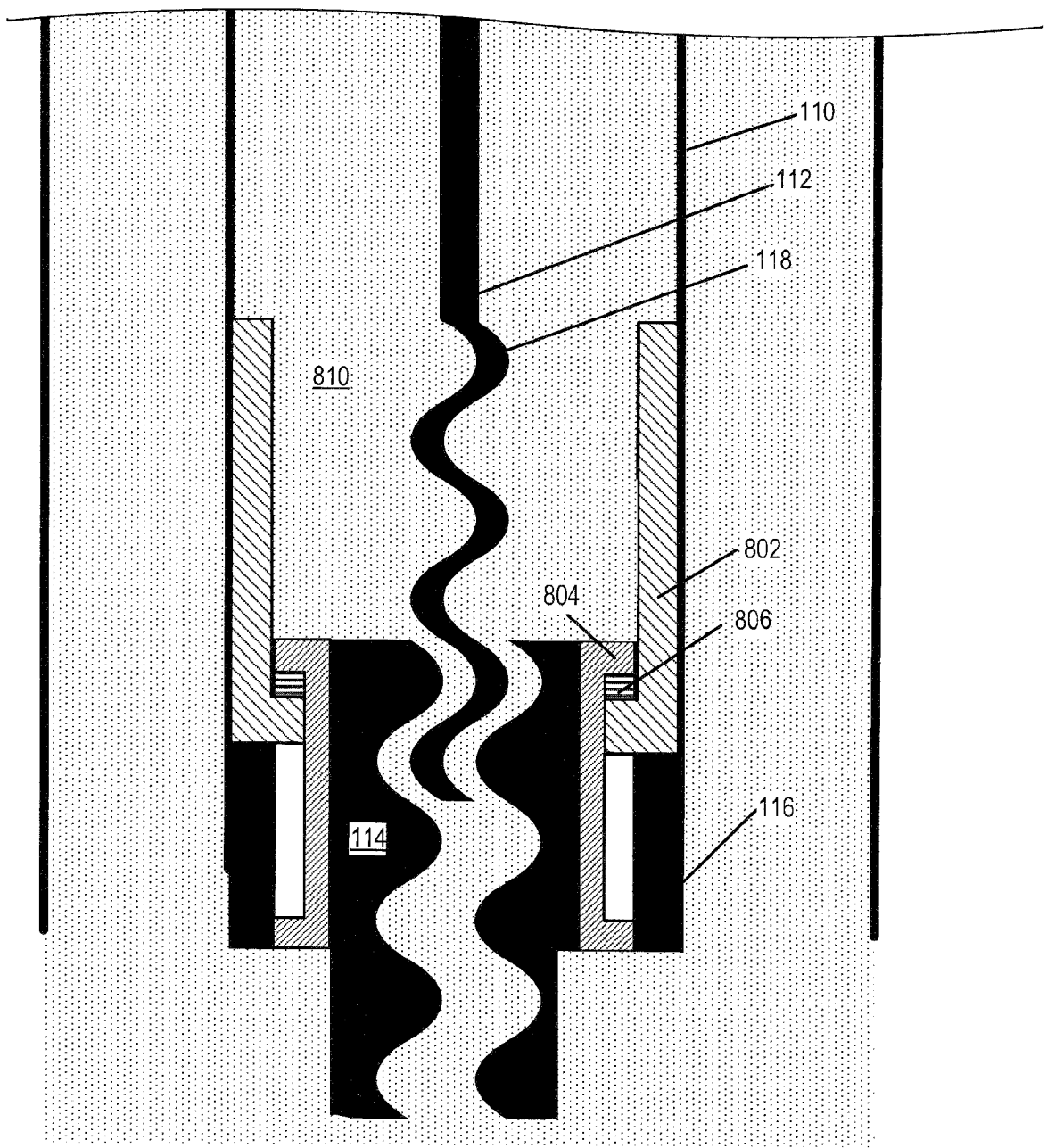
Figure 8C:
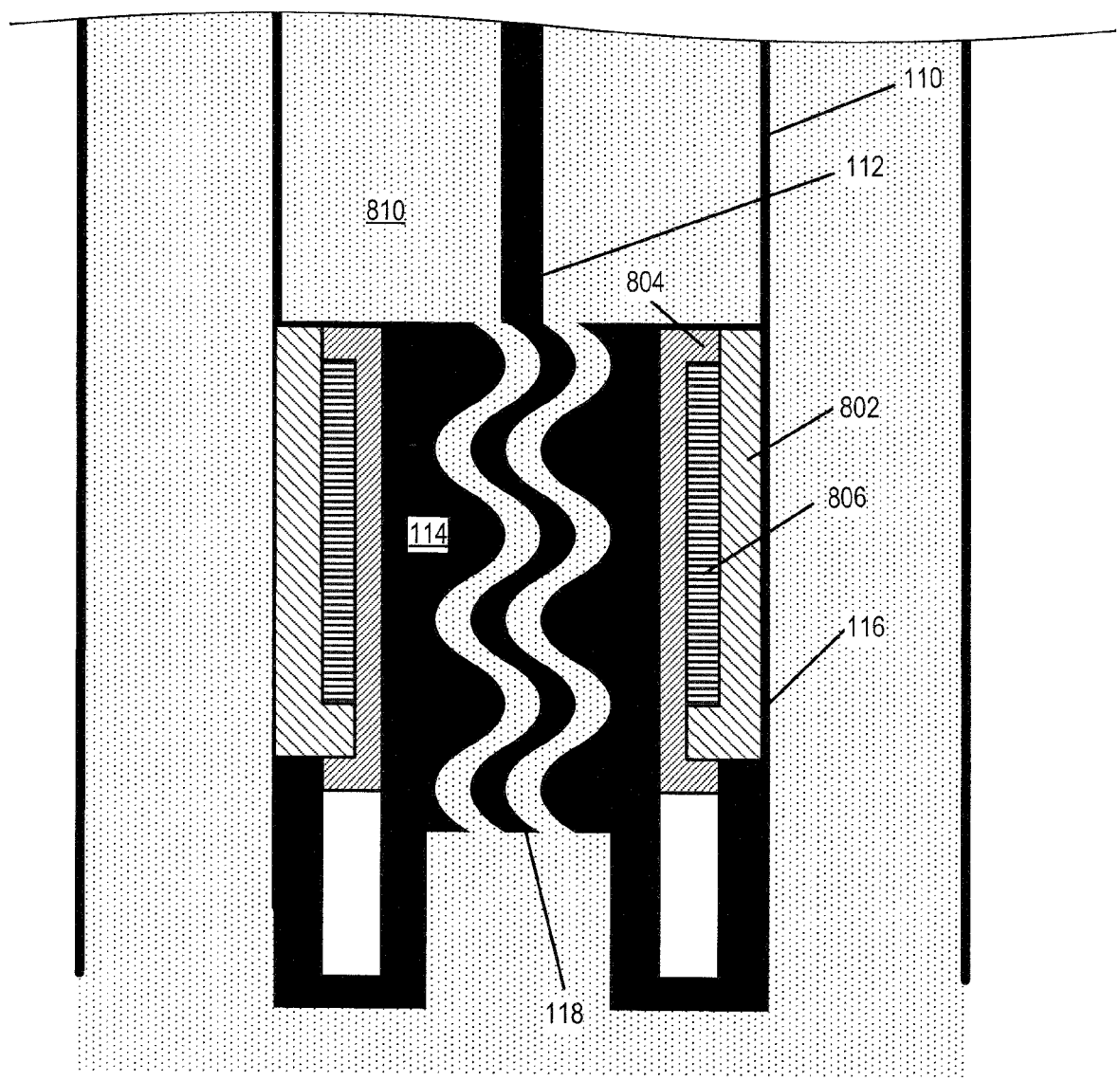

FIGS. 8A-8C illustrate a progressive cavity pump assembly having an exemplary regulator assembly. FIG. 8A shows a progressive cavity pump assembly at a nominal pressure. FIG. 8B shows a progressive cavity pump assembly during a high pressure event. FIG. 8C shows a progressive cavity pump assembly during a low pressure event. The progressive cavity pump assembly has a rotor 118 that may be longitudinally displaced relative to the stator 114. Thus, a varying portion of the rotor 118 may be within the stator 114, which effectively controls the pressure capability of the pump by changing the lift of the pump. The regulator assembly includes a substantially cylindrical guide 802 coaxial with the interconnect 110 on which stator 114 is slidably mounted with a mounting collar 804. Biasing member 806 axially biases the rotor 118 within the stator 114. An expandable chamber 810 connected to the stator 114 lengthens as pressure increases. In the illustrated embodiment, the expandable chamber comprises the interconnect 110 and the charge pump 116. Some embodiments may also include a damping member (not shown) to curtail pressure oscillation.

During operation with a nominal chamber pressure, shown in FIG. 8A, the biasing member 806 is partially compressed by the pressure in the chamber 810 so that a portion of the rotor 118 is outside of the stator 114. The lift of the charge pump at this configuration is the nominal lift for which the pump assembly has been designed. The nominal lift is typically the optimal lift for the gas percentage of wellbore fluid most likely to be present in the well, but may also be an optimal lift for the average gas percentage, or some other lift. The optimal lift could also be the maximum lift of the charge pump.

During a high pressure event in the chamber 810, as shown in FIG. 8B, the force exerted by the pressure on the expandable chamber 810 increases, further compressing the biasing member 806 and sliding the stator 114 further downward so that the rotor 118 is drawn farther out of stator 114. Thus, the pump effectively has a lower lift and thus a lower pressure capability at a given speed. The lower lift decreases the interconnect pressure, thus regulating the main pump's inlet pressure. In essence, the regulator assembly provides negative feedback to hold the main pump's inlet pressure in the desired range.

Upon a low pressure event in the chamber, as shown in FIG. 8C, the force exerted by the pressure on the expandable chamber 810 decreases from normal, lessening the compression of the biasing member 806 and sliding the stator 114 further upward from its nominal position so that the rotor 118 is displaced farther into stator 114. This effectively increases the charge pump's lift, and thus, pressure capability at a given speed, increasing the main pump's inlet pressure.

Figure 9:
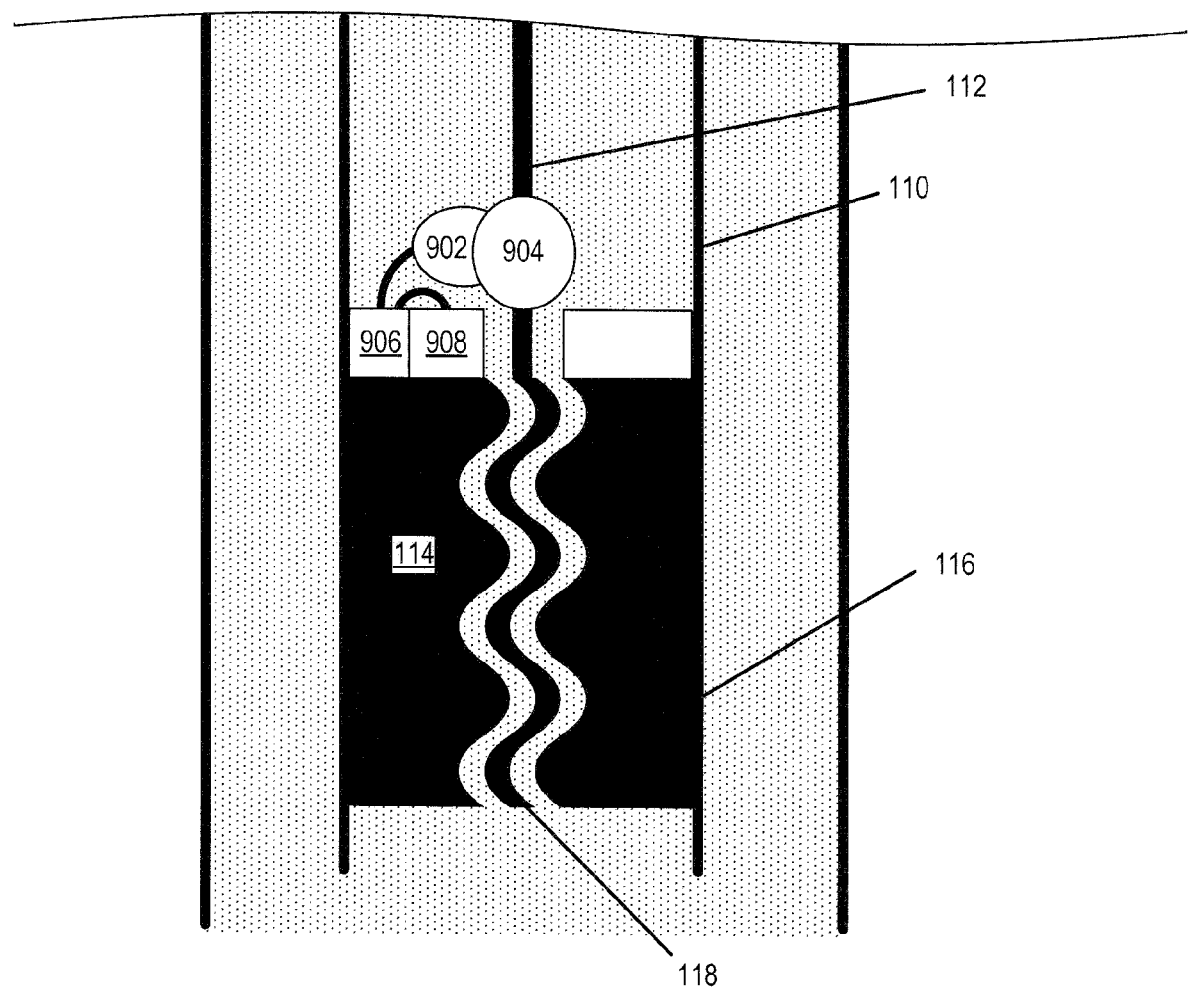
FIG. 9 illustrates a progressive cavity pump assembly having another exemplary regulator assembly.

FIG. 9 illustrates a progressive cavity pump assembly having another regulator assembly 900. The regulator assembly 900 includes a gearbox 904 linking the drive shaft 112 to a rotor 118, an actuator 902 for selecting a gear, a pressure sensor 908, and a controller 906 operatively coupled to the pressure sensor 908 and the actuator 902. The controller may be connected to the gearbox 904 and the actuator 902 by hydraulic lines, electrical wires, fiber optic cables, tension cables, or a combination of these, or other known control links.

The controller 904 receives pressure information from the pressure sensor 908. The controller 904 selects a higher gear if the pressure registered by the pressure sensor 908 is below a first threshold pressure. Alternatively, controller 904 selects a lower gear if the pressure registered by the pressure sensor 908 is above a second threshold pressure. By selecting a higher gear, the rotor 118 rotates at a higher speed, increasing the pump's capacity. Selecting a lower gear has the opposite effect. It may be desirable that the pressure exceed the particular threshold for a period of time before the controller 904 selects another gear. Further, the amount of time may vary as a function of the amount by which the threshold pressure is exceeded.

It should be understood that the invention concepts disclosed herein are capable of many modifications. Such modifications may include, but are not limited to, modifications in the number, configuration, and sizes of ports, pump size and displacement, and in particular the use of pumps other than progressive cavity pumps for either the main pump or charge pump. To the extent such modifications fall within the scope of the appended claims and their equivalents, they are intended to be covered by this patent.

What is claimed is:

1. A bladder for mounting in the interconnect of a downhole pump assembly so as to block one or more pressure relief ports, the bladder comprising:
    a pliable membrane having an opening at a first end in fluid communication with a charge pump outlet and an opening at a second end in fluid communication with a main pump intake port; and
    one or more slits in the membrane aligned with the one or more pressure relief ports, the one or more slits being responsive to a threshold pressure by opening.

2. The bladder of claim 1, wherein the bladder is formed from an elastomer material.

3. The bladder of claim 1, comprising a plurality of connected pliable membranes.

4. The bladder of claim 3, wherein one membrane is formed from a first material and a second membrane is formed from a second material.

5. The bladder of claim 3, wherein one membrane is thicker than at least one other membrane.

6. The bladder of claim 1, wherein the slits are varying sizes.

* * * * *